United States Patent
Kobayashi

(10) Patent No.: US 10,810,953 B2
(45) Date of Patent: Oct. 20, 2020

(54) FIELD SEQUENTIAL IMAGE DISPLAY DEVICE AND IMAGE DISPLAY METHOD

(71) Applicant: SHARP KABUSHIKI KAISHA, Sakai, Osaka (JP)

(72) Inventor: Masamitsu Kobayashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/346,356

(22) PCT Filed: Sep. 25, 2017

(86) PCT No.: PCT/JP2017/034504
§ 371 (c)(1),
(2) Date: Apr. 30, 2019

(87) PCT Pub. No.: WO2018/092419
PCT Pub. Date: May 24, 2018

(65) Prior Publication Data
US 2019/0272794 A1    Sep. 5, 2019

(30) Foreign Application Priority Data
Nov. 17, 2016  (JP) .................... 2016-223886

(51) Int. Cl.
*G09G 3/20* (2006.01)
*G09G 3/36* (2006.01)
(Continued)

(52) U.S. Cl.
CPC ........... *G09G 3/3607* (2013.01); *G02F 1/133* (2013.01); *G09G 3/20* (2013.01); *G09G 3/34* (2013.01);
(Continued)

(58) Field of Classification Search
CPC .... G02F 1/133; G09G 3/3648; G09G 3/3413; G09G 3/36; G09G 3/34; G09G 3/20;
(Continued)

(56) References Cited

U.S. PATENT DOCUMENTS 7,277,075 B1    10/2007   Hirano et al.
2002/0063670 A1  5/2002   Yoshinaga et al.
(Continued)

FOREIGN PATENT DOCUMENTS

JP   2001-147666 A   5/2001
JP   2002-229531 A   8/2002
(Continued)

*Primary Examiner* — Towfiq Elahi
(74) *Attorney, Agent, or Firm* — ScienBiziP, P.C.

(57) ABSTRACT

With a field sequential method, image display having sufficiently high color reproduction is performed, and an occurrence of color breakup is more reliably suppressed. In a field sequential liquid crystal display apparatus in which a plurality of subframes including a red subframe, a green subframe, a blue subframe, and a white (common color) subframe constitutes each frame, an image data conversion unit (30) converts input image data (D1) corresponding to red, green, and blue into driving image data (D2) corresponding to the plurality of subframes, based on an adjustment coefficient (Ks) and a distribution ratio (WRs) for the white subframe, for each pixel. Two distribution ratios are selectively used as the distribution ratio (WRs). A function of obtaining a second distribution ratio (WRsv2) of the two distribution ratios is set such that the distribution ratio (WRsv2) increases as the adjusted brightness (brightness after amplification and compression processing) (V) for an input image becomes smaller.

16 Claims, 22 Drawing Sheets

(51) Int. Cl.
*G09G 3/34* (2006.01)
*G02F 1/133* (2006.01)

(52) U.S. Cl.
CPC .............. *G09G 3/36* (2013.01); *G09G 3/3648* (2013.01); *G09G 2320/0626* (2013.01); *G09G 2320/0666* (2013.01)

(58) Field of Classification Search
CPC ............. G09G 3/3607; G09G 2340/06; G09G 2310/0235; G09G 2320/0626; G09G 2320/0666
See application file for complete search history.

(56) References Cited

U.S. PATENT DOCUMENTS

| | | | |
|---|---|---|---|
| 2008/0180384 A1 | 7/2008 | Aoki et al. | |
| 2009/0174810 A1* | 7/2009 | Endo ................. | G02B 26/0833 348/390.1 |
| 2009/0315921 A1 | 12/2009 | Sakaigawa et al. | |
| 2012/0062584 A1* | 3/2012 | Furukawa ............ | H04N 9/3111 345/589 |

FOREIGN PATENT DOCUMENTS

| | | |
|---|---|---|
| JP | 2008-139809 A | 6/2008 |
| JP | 2010-033009 A | 2/2010 |

* cited by examiner

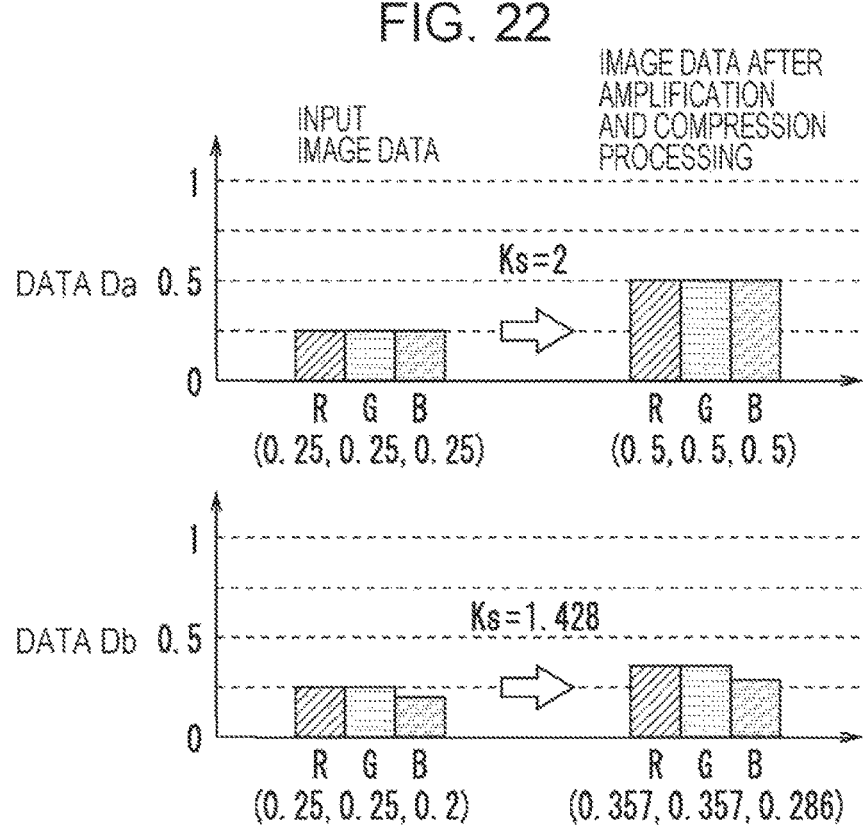
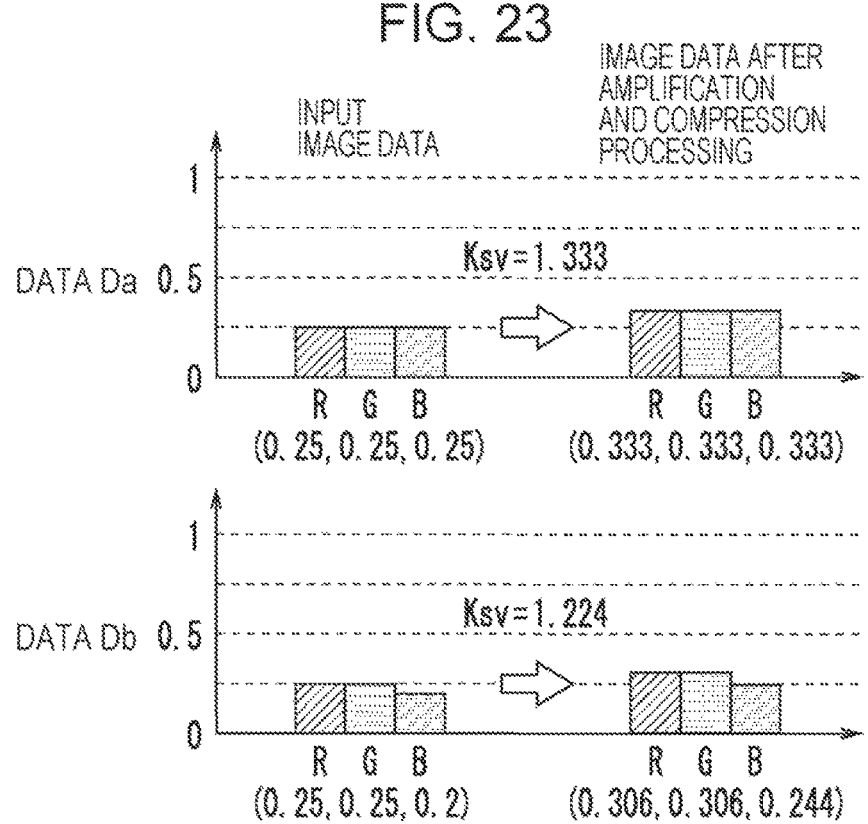

FIELD SEQUENTIAL IMAGE DISPLAY DEVICE AND IMAGE DISPLAY METHOD

TECHNICAL FIELD

The present invention relates to an image display device, and particularly, to a field sequential image display device and a field sequential liquid image display method.

BACKGROUND ART

In the related art, a field sequential image display device that displays a plurality of subframes in one frame period is known. For example, a typical field sequential image display device includes a backlight including a red light source, a green light source, and a blue light source, and displays red, green, and blue subframes in one frame period. When a red subframe is displayed, a display panel is driven based on red image data, and the red light source emits light. A green subframe and a blue subframe are displayed in the similar manner. Three subframes displayed in a time division manner are combined on the retinae of an observer by an afterimage phenomenon, and thus the observer recognizes these subframes as one color image.

In the field sequential image display device, when the eyeline of the observer moves in a display screen, a situation in which the observer looks as if the colors of the subframes are separated from each other may occur (this phenomenon is referred to as "color breakup"). In order to suppress the occurrence of color breakup, an image display device that displays a white subframe in addition to the red, green, and blue subframes is known. An image display device that performs amplification processing of multiplying input image data by one or more coefficients when driving image data including red image data, green image data, blue image data, and white image data is obtained based on the input image data including red image data, green image data, and blue image data is known.

Relating to an image display device disclosed in this application, PTLs 1 and 2 disclose a method of obtaining driving image data including red image data, green image data, blue image data, and white image data based on input image data including red image data, green image data, and blue image data, in an image display device which includes subpixels of red, green, blue and white colors and is not the field sequential type.

CITATION LIST

Patent Literature

PTL 1: Japanese Unexamined Patent Application Publication No. 2001-147666
PTL 2: Japanese Unexamined Patent Application Publication No. 2008-139809
PTL 3: Japanese Unexamined Patent Application Publication No. 2010-33009
PTL 4: Japanese Unexamined Patent Application Publication No. 2002-229531

SUMMARY OF INVENTION

Technical Problem

In the above-described field sequential image display device, a white subframe is provided as a common color subframe for preventing the occurrence of color breakup, and driving image data is generated by image-data conversion processing including amplification processing of multiplying input image data by one or more coefficients, a difference in hue, saturation, and luminance may occur between a color (referred to as "an extended input color" below) indicated by image data subjected to the amplification processing and a color (referred to as "an actual display color" below) which is actually displayed in a display device such as a liquid crystal panel. In this case, image display having sufficiently high color reproduction is not performed.

In the above-described field sequential image display device, depending on an image to be displayed, a distribution ratio for the white subframe is not sufficient in conversion from input image data to driving image data. Thus, reliable suppression of the occurrence of color breakup may not be possible.

Thus, it is desired to provide a field sequential image display device and a field sequential image display method in which it is possible to perform image display having sufficiently high color reproduction and to more reliably suppress the occurrence of color breakup.

Solution to Problem

According to a first aspect of the present invention, there is provided a field sequential image display device in which a plurality of subframe periods including a plurality of primary-color subframe periods respectively corresponding to a plurality of primary colors and at least one common-color subframe period is included in each frame period. The field sequential image display device includes an image data conversion unit that receives input image data corresponding to the plurality of primary colors and generates driving image data corresponding to the plurality of subframe periods from the input image data by obtaining a pixel data value of each of the plurality of subframe periods for each pixel of an input image represented by the input image data, based on the input image data, and a display unit that displays an image based on the driving image data.

The image data conversion unit generates the driving image data by conversion processing in which, for each pixel in the input image, an adjustment coefficient to be multiplied by a value of the pixel and a common-color distribution ratio are determined, and a pixel data value in each of the plurality of subframe periods is obtained from the value of the pixel based on the adjustment coefficient and the common-color distribution ratio, the common-color distribution ratio being defined as a ratio of a display light quantity of a common color component, which is to be emitted in the common-color subframe period to a display light quantity of the common color component, which is to be emitted in one frame period for displaying the pixel.

In the conversion processing, for each pixel in the input image, the common-color distribution ratio is determined in accordance with the saturation and an adjusted brightness of the pixel such that the common-color distribution ratio increases as a hue and the saturation in an HSV space are maintained, and the adjusted brightness decreases, and the pixel is allowed to be displayed in the display unit, the adjusted brightness being a brightness after the value of the pixel is multiplied by the adjustment coefficient.

According to a second aspect of the present invention, in the first aspect of the present invention, for each pixel in the input image, the image data conversion unit determines a tentative distribution ratio corresponding to the ratio in accordance with the saturation of the pixel such that the pixel data value in the common-color subframe period is greater than a minimum value of pixel data values in the plurality of primary-color subframe periods and smaller than a maximum value thereof, and determines the common-color distribution ratio based on the tentative distribution ratio in accordance with the adjusted brightness of the pixel.

According to a third aspect of the present invention, in the first aspect of the present invention, the image data conversion unit includes a parameter storage unit that stores a parameter used in the conversion processing, and the parameter storage unit stores a parameter in accordance with response characteristics in image display in the display unit.

According to a fourth aspect of the present invention, in the third aspect of the present invention, the image data conversion unit further stores a parameter for designating a range of a maximum value in accordance with a minimum value of pixel data values of each pixel in the input image in the plurality of subframe periods.

According to a fifth aspect of the present invention, in the third or fourth aspect of the present invention, the display unit includes a light source unit that emits light having a corresponding color in each subframe period, a light modulation unit that cause the light from the light source unit to be transmitted therethrough or be reflected thereby, a light-source-unit driving circuit that drives the light source unit to irradiate the light modulation unit with the light having the corresponding color in each subframe period, and a light-modulation-unit driving circuit that controls transmittance or reflectance in the light modulation unit such that an image of the corresponding color in each subframe period is displayed.

The parameter storage unit further stores a light emission control parameter, and the light-source-unit driving circuit controls light emission luminance of a common color component in the light source unit based on the light emission control parameter.

According to a sixth aspect of the present invention, in the first aspect of the present invention, the image data conversion unit obtains the common-color distribution ratio in accordance with a function having a value which smoothly changes depending on the saturation.

According to a seventh aspect of the present invention, in the first aspect of the present invention, the image data conversion unit generates the driving image data by conversion processing in which, for each pixel in the input image, the adjustment coefficient is determined based on pixel data values in the plurality of subframe periods in accordance with the saturation of the pixel in a range in which the pixel is allowed to be displayed in the display unit, and the pixel data value in each of the plurality of subframe periods is obtained from the value of the pixel based on the adjustment coefficient and the common-color distribution ratio.

According to an eighth aspect of the present invention, in the seventh aspect of the present invention, the image data conversion unit obtains the common-color distribution ratio and the adjustment coefficient in accordance with functions having a value which smoothly changes depending on the saturation.

According to a ninth aspect of the present invention, in the seventh aspect of the present invention, the image data conversion unit determines the adjustment coefficient and the common-color distribution ratio such that a maximum value is linearly limited with respect to a minimum value among pixel data values in the plurality of subframe periods, for each pixel in the input image.

According to a tenth aspect of the present invention, in the seventh aspect of the present invention, the image data conversion unit assumes a function of the saturation, which indicates a tentative coefficient for obtaining the adjustment coefficient and a function of the saturation, which indicates a correction coefficient to be multiplied by the tentative coefficient, and obtains a multiplication result of the tentative coefficient and the correction coefficient based on the saturation of the pixel for each pixel in the input image, as the adjustment coefficient.

The correction coefficient is set such that a rate of the adjustment coefficient changing with respect to the saturation when the saturation is equal to or smaller than a predetermined value is equal to or smaller than a predetermined value.

According to an eleventh aspect of the present invention, in the first aspect of the present invention, the image data conversion unit includes a parameter storage unit that stores a parameter used in the conversion processing, and the display unit includes a temperature sensor, the parameter storage unit stores a plurality of values for the parameter, in accordance with a temperature, and the image data conversion unit selects the value in accordance with the temperature measured by the temperature sensor among the plurality of values stored in the parameter storage unit and uses the selected value in the conversion processing.

According to a twelfth aspect of the present invention, in the first aspect of the present invention, the image data conversion unit includes a frame memory that stores the input image data, and generates the driving image data corresponding to a pixel, based on the input image data which has been stored in the frame memory and corresponds to a plurality of pixels, for each pixel in the input image.

According to a thirteenth aspect of the present invention, in the first aspect of the present invention, the image data conversion unit performs the conversion processing on normalized luminance data.

According to a fourteenth aspect of the present invention, in the first aspect of the present invention, the image data conversion unit obtains the driving image data by performing response compensation processing on image data obtained after the conversion processing.

According to a fifteenth aspect of the present invention, in the first aspect of the present invention, the plurality of primary colors includes blue, green, and red, and a common color is white.

According to a sixteenth aspect of the present invention, there is provided a field sequential image display method in which a plurality of subframe periods including a plurality of primary-color subframe periods respectively corresponding to a plurality of primary colors and at least one common-color subframe period is included in each frame period.

The method includes an image-data conversion step of receiving input image data corresponding to the plurality of primary colors and generating driving image data corresponding to the plurality of subframe periods from the input image data by obtaining a pixel data value of each of the plurality of subframe periods for each pixel of an input image represented by the input image data, based on the input image data, and a display step of displaying an image based on the driving image data.

The image-data conversion step includes a coefficient-and-distribution ratio determination step of determining an adjustment coefficient to be multiplied by a value of the pixel and determining a common-color distribution ratio defined as a ratio of a display light quantity of a common color component, which is to be emitted in the common-color subframe period to a display light quantity of the common color component, which is to be emitted in one frame period for displaying the pixel, for each pixel in the input image, and a driving image-data operation step of generating the driving image data by conversion processing of obtaining the pixel data value in each of the plurality of subframe periods from the value of the pixel based on the adjustment coefficient and the common-color distribution ratio, for each pixel in the input image.

In the coefficient-and-distribution ratio determination step, for each pixel in the input image, the common-color distribution ratio is determined in accordance with the saturation and an adjusted brightness of the pixel such that the common-color distribution ratio increases as a hue and the saturation in an HSV space are maintained, and the adjusted brightness decreases, and the pixel is allowed to be displayed in the display unit, the adjusted brightness being a brightness after the value of the pixel is multiplied by the adjustment coefficient.

Other aspects of the present invention are clear from descriptions regarding the first to sixteenth aspects of the present invention and embodiments described later, and thus descriptions thereof will be omitted.

Advantageous Effects of Invention

According to the first aspect of the present invention, the common-color distribution ratio is determined in accordance with the saturation and the adjusted brightness of a pixel such that the common-color distribution ratio increases as the hue and the saturation in the HSV space are maintained, and the adjusted brightness becomes smaller, for each pixel in an input image indicated by input image data. Since driving image data is generated based on such a common-color distribution ratio, it is possible to suppress the occurrence of color breakup while image display having high color reproduction is performed.

According to the second aspect of the present invention, for each pixel in the input image, the tentative distribution ratio is obtained such that the pixel data value in the common-color subframe period is greater than the minimum value of the pixel data values in the plurality of primary-color subframe periods and smaller than the maximum value. The common-color distribution ratio increasing as the brightness becomes smaller is obtained based on the tentative distribution ratio. Thus, it is possible to suppress the occurrence of color breakup while image display having high color reproduction is performed.

According to the third aspect of the present invention, it is possible to improve color reproduction by setting the suitable parameter in accordance with the response characteristics of the display unit.

According to the fourth aspect of the present invention, the maximum value of driving image data in one frame period is limited in accordance with the minimum value of the driving image data in one frame period, by using the parameter stored in the parameter storage unit. Thus, it is possible to improve color reproduction.

According to the fifth aspect of the present invention, it is possible to reduce heat generated in the light source by controlling the luminance of the light source when a common color subframe is displayed in a field sequential image display device that includes the display unit using the light modulation unit that cause light from the light source to be transmitted therethrough or be reflected thereby.

According to the sixth aspect of the present invention, the common-color distribution ratio is obtained in accordance with the function which smoothly changes depending on the saturation. Thus, it is possible to prevent the occurrence of distortion of a gradation image when the image is displayed. Thus, it is possible to perform image display having high color reproduction.

According to the seventh aspect of the present invention, the tentative distribution ratio is obtained, for each pixel in the input image, such that the pixel data value in the common-color subframe period is greater than the minimum value of the pixel data values in the plurality of primary-color subframe periods and smaller than the maximum value thereof. In addition, for each pixel in the input image, the adjustment coefficient to be multiplied by the value of the pixel is obtained based on the pixel data values in the plurality of subframe periods, in a range in which the pixel is allowed to be displayed in the display unit, in accordance with the saturation of the pixel. The common-color distribution ratio increasing as the brightness becomes smaller is obtained with the tentative distribution ratio and the adjustment coefficient which have obtained in the above-described manner. Thus, the more preferable common-color distribution ratio depending on the adjustment coefficient is obtained. Thus, it is possible to suppress the occurrence of color breakup while image display having high color reproduction is performed.

According to the eighth aspect of the present invention, the common-color distribution ratio and the adjustment coefficient are obtained in accordance with the functions which smoothly change depending on the saturation. Thus, it is possible to prevent the occurrence of distortion of a gradation image when the image is displayed. Thus, it is possible to perform image display having high color reproduction.

According to the ninth aspect of the present invention, the maximum value of the driving image data in one frame period is linearly limited with respect to the minimum value of the driving image data in the one frame period. Thus, the range of the maximum value is determined in accordance with the minimum value. Thus, it is possible to suppress a change of the image data after the conversion, in one frame period, and to improve color reproduction of the image display device.

According to the tenth aspect of the present invention, the amount of the adjustment coefficient changing with respect to the change of the saturation S is small even though the saturation S is small, and the luminance is high (see an H2 portion in FIG. 16). Since the driving image data is generated based on such an adjustment coefficient, it is possible to suppress an occurrence of gradation skipping occurring in a display image, and to suppress an occurrence of noise occurring at a high-luminance portion included in the display image.

According to the eleventh aspect of the present invention, the conversion processing is performed based on the parameter in accordance with the temperature of the display unit. Thus, it is possible to improve color reproduction even in a case where the response characteristics of the display unit change in accordance with the temperature.

According to the twelfth aspect of the present invention, the conversion processing is performed based on the input image data corresponding to the plurality of pixels. Thus, it is possible to prevent the occurrence of a situation in which the color of a pixel rapidly changes in a spatial direction or a time direction.

According to the thirteenth aspect of the present invention, the conversion processing is performed on normalized luminance data. Thus, it is possible to accurately perform the conversion processing.

According to the fourteenth aspect of the present invention, the response compensation processing is performed on image data after the conversion processing has been performed. Thus, it is possible to display a desired image even in a case where the response rate of the display unit is slow.

According to the fifteenth aspect, in the image display device that displays subframes of three primary colors and the white color based on the input image data corresponding to the three primary colors, it is possible to improve color reproduction.

Effects in other aspects of the present invention are clearly obtained from the effects in the first to fifteenth aspects of the present invention and the following descriptions of embodiments. Thus, descriptions thereof will not be repeated.

BRIEF DESCRIPTION OF DRAWINGS

FIG. 22 is a diagram illustrating an example of image-data conversion processing in a case where the low-luminance-portion noise handling processing is not performed in the second embodiment.

FIG. 23 is a diagram illustrating an example of the image-data conversion processing in a case where the low-luminance-portion noise handling processing is performed in the second embodiment.

DESCRIPTION OF EMBODIMENTS

Hereinafter, image display devices and image display methods according to embodiments will be described with reference to the drawings. Firstly, the following is noted. "Computation" provided in the following descriptions includes the meaning that "a computation result is stored in a table in advance, and the computation result is obtained based on the table", in addition to the meaning of "obtaining a computation result with a computing machine".

1. First Embodiment

<1.1 Overall Configuration>

Figure 1:
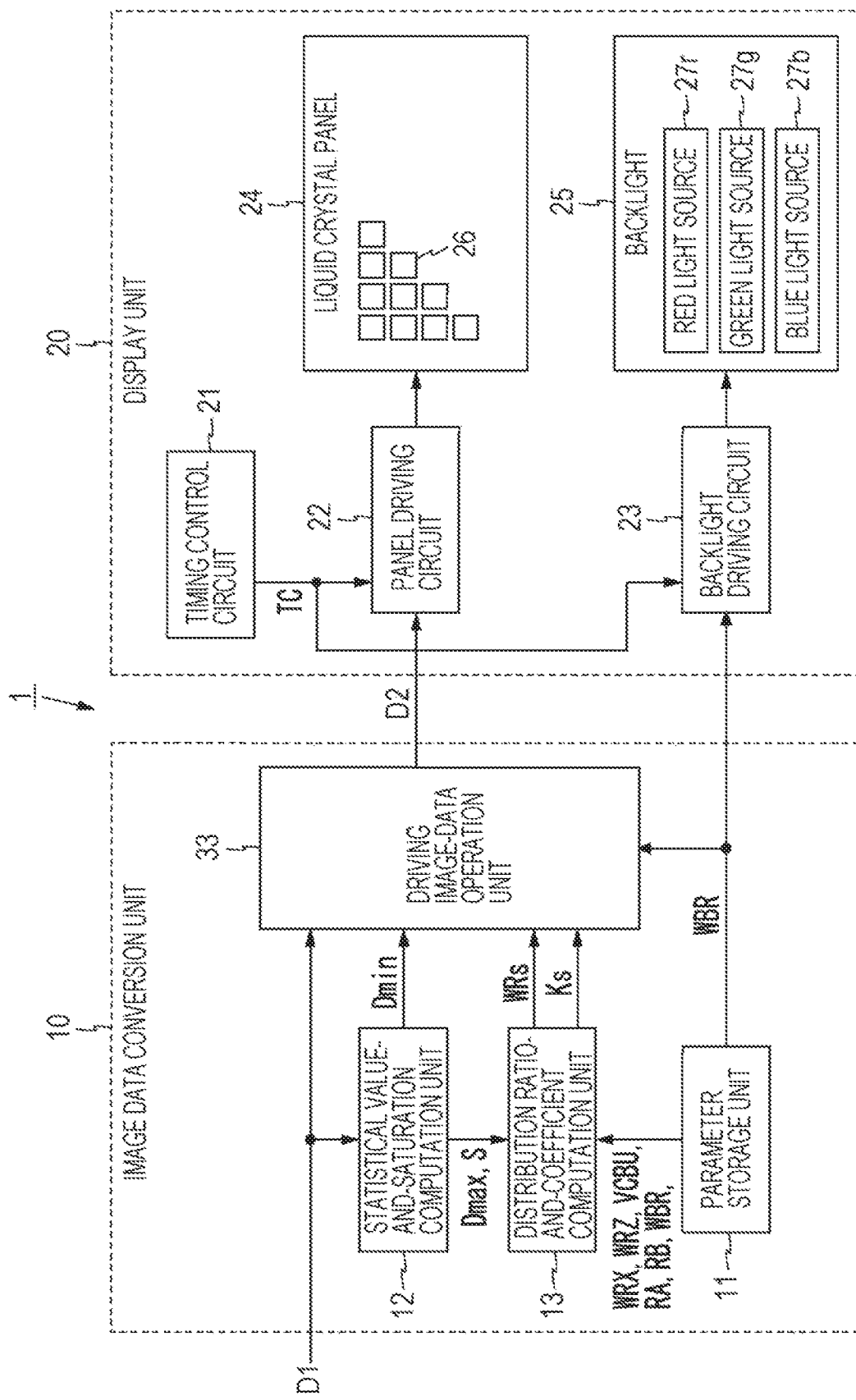
FIG. 1 is a block diagram illustrating a configuration of an image display device according to a first embodiment.

FIG. 1 is a block diagram illustrating a configuration of an image display device according to a first embodiment. An image display device 1 illustrated in FIG. 1 includes an image data conversion unit 10 and a display unit 20. The image data conversion unit 10 includes a parameter storage unit 11, a statistical value-and-saturation computation unit 12, a distribution ratio-and-coefficient computation unit 13, and a driving image-data operation unit 33. The display unit 20 includes a timing control circuit 21, a panel driving circuit 22, a backlight driving circuit 23, a liquid crystal panel 24 as a light modulation unit, and a backlight 25 as a light source unit.

The image display device 1 is a field sequential liquid crystal display apparatus. The image display device 1 divides one frame period into a plurality of subframes periods and displays a different color subframe in each of the subframe periods. Hereinafter, it is assumed that the image display device 1 divides one frame period into four subframe periods and respectively displays white, blue, green, and red subframes in first to fourth subframe periods. In the image display device 1, a white subframe is a common color subframe. "The color" in each subframe indicates a light source color. It is assumed that the display unit 20 in the image display device 1 can display "a white color" as a desired color temperature in a case where "1" (maximum value) is assigned to any of a red color, a green color, and a blue color in light-source driving data used for driving the backlight 25 (also similar in other embodiments described later).

Input image data D1 including red image data, green image data, and blue image data is input to the image display device 1. The image data conversion unit 10 obtains driving image data D2 corresponding to white, blue, green, and red subframes, based on the input image data D1. The processing is referred to as "image-data conversion processing" below. Pieces of the driving image data D2 corresponding to white, blue, green, and red subframes are referred to as "white image data, blue image data, green image data, and red image data which are included in the driving image data D2", respectively. The display unit 20 displays the white, blue, green, and red subframes in one frame period, based on the driving image data D2.

The timing control circuit 21 outputs a timing control signal TC to the panel driving circuit 22 and the backlight driving circuit 23. The panel driving circuit 22 drives the liquid crystal panel 24 based on the timing control signal TC and the driving image data D2. The backlight driving circuit 23 drives the backlight 25 based on the timing control signal TC and a parameter WBR (which will be described later) from the parameter storage unit 11. The liquid crystal panel 24 includes a plurality of pixels 26 arranged in two dimensions. The backlight 25 includes a red light source 27*r*, a green light source 27*g*, and a blue light source 27*b* (the light sources 27*r*, 27*g*, and 27*b* are also collectively referred to as "a light source 27" below). The backlight 25 may include a white light source. For example, a light emitting diode (LED) is used as the light source 27.

In the first subframe period, the panel driving circuit 22 drives the liquid crystal panel 24 based on white image data included in the driving image data D2, and the backlight driving circuit 23 causes the red light source 27*r*, the green light source 27*g*, and the blue light source 27*b* to emit light. Thus, a white subframe is displayed. In a case where the backlight 25 includes a white light source, the backlight driving circuit 23 may cause the white light source to emit light in the first subframe period.

In the second subframe period, the panel driving circuit 22 drives the liquid crystal panel 24 based on blue image data included in the driving image data D2, and the backlight driving circuit 23 causes the blue light source 27*b* to emit light. Thus, a blue subframe is displayed. In the third subframe period, the panel driving circuit 22 drives the liquid crystal panel 24 based on green image data included in the driving image data D2, and the backlight driving circuit 23 causes the green light source 27*g* to emit light. Thus, a green subframe is displayed. In the fourth subframe period, the panel driving circuit 22 drives the liquid crystal panel 24 based on red image data included in the driving image data D2, and the backlight driving circuit 23 causes the red light source 27*r* to emit light. Thus, a red subframe is displayed.

<1.2 Details of Image Data Conversion Unit>

Details of the image data conversion unit 10 will be described below. Red image data, green image data, and blue image data (red, green, and blue are original color components) which are included in the input image data D1 are luminance data normalized to have a value of 0 to 1. When pieces of image data of three colors are equal to each other, the pixel 26 becomes achromatic. Red image data, green image data, and blue image data which are included in the driving image data D2 are also luminance data normalized to have a value of 0 to 1. For example, a microcomputer including a central processing unit (CPU) and a memory may be used as the image data conversion unit 10. The image data conversion unit 10 may be realized in software by the microcomputer executing a predetermined program corresponding to FIG. 3 described later. Instead, the entirety or some components of the image data conversion unit 10 may be realized with dedicated hardware (typically, application specific integrated circuit designed to be dedicated).

In image-data conversion processing, amplification and compression processing and color-component conversion processing are performed (see Expressions (5a) to (5d) described later). The amplification and compression processing is performed with an adjustment coefficient Ks which is a coefficient to be multiplied by the values (referred to as "BGR pixel data values of an input image" below) of the blue color, the green color, and the red color in each pixel of an image (input image) representing input image data D1. In the color-component conversion processing, the BGR pixel data value of the input image subjected to the amplification and compression processing is converted into pixel data values (referred to as "driving WBGR pixel data values" below) of a white subframe, a blue subframe, a green subframe, and a red subframe. In the image-data conversion processing, white image data (having a value to be distributed to a common color subframe) included in the driving image data D2 is determined in a range of 0 to 1. In the image-data conversion processing, for each pixel in an input image, a ratio (referred to as "a distribution ratio WRs of a white subframe" or "a common-color distribution ratio WRs" below, or simply referred to as "a distribution ratio WRs" below) of the display light quantity of a white-color component to be emitted in a white subframe period to the display light quantity of the white-color component to be emitted in one frame period for displaying the pixel is firstly determined. Then, the driving WGBR pixel data values of white image data are obtained based on the distribution ratio WRs. For example, in a case where the adjustment coefficient Ks is determined to 1 and the distribution ratio WRs is determined to be 0.6 when red image data included in input image data D1 is 0.5, and green image data and blue image data are 1, white image data included in driving image data D2 is 0.3. In the embodiment as described later, the luminance of the light source 27 when the white subframe is displayed is controlled to be WBR times the luminance of the light source 27 when other subframes are displayed, in accordance with the parameter WBR. Therefore, a relation between the pixel data value in a white subframe period and display luminance by this pixel data value depends on the parameter WBR. Considering this point, the common-color distribution ratio WRs is more accurately defined as a ratio of a value obtained by a product of the white image data and the parameter WBR in the driving image data D2, to the minimum value of the BGR pixel data values of the input image subjected to the amplification and compression processing.

The parameter storage unit 11 stores parameters WRX, WRZ, VCBU, RA, RB, and WBR used in image-data conversion processing. The statistical value-and-saturation computation unit 12 obtains the maximum value Dmax, the minimum value Dmin, and the saturation S based on input image data D1, for each pixel. The distribution ratio-and-coefficient computation unit 13 obtains the distribution ratio WRs and an adjustment coefficient (also simply referred to as "a coefficient" below) Ks based on the maximum value Dmax, the saturation S, and the parameters WRX, WRZ, VCBU, RA, RB, and WBR (details will be described later). The driving image-data operation unit 33 obtains driving image data D2 based on the input image data D1, the minimum value Dmin, the distribution ratio WRs, the coefficient Ks, and the parameter WBR.

The parameters stored in the parameter storage unit 11 will be described below. The parameter WRX is a parameter depending on response characteristics of a pixel 26 provided in the display unit 20. The parameter WRX is included in a calculation expression of obtaining the distribution ratio WRs. The parameter WBR designates the luminance of the light source 27 which is used when a white subframe is displayed and is provided in the backlight 25, and takes a value in a range of $0 \leq WBR \leq 1$.

The minimum value of driving image data D2 in one frame period is set as DDmin, and the maximum value thereof is set as DDmax. The distribution ratio-and-coefficient computation unit 13 obtain the coefficient Ks in accordance with the parameters RA and RB stored in the parameter storage unit 11, so as to satisfy the following expression (1).

$$DDmax \leq RA \cdot DDmin + RB \quad (1)$$

Figure 2:
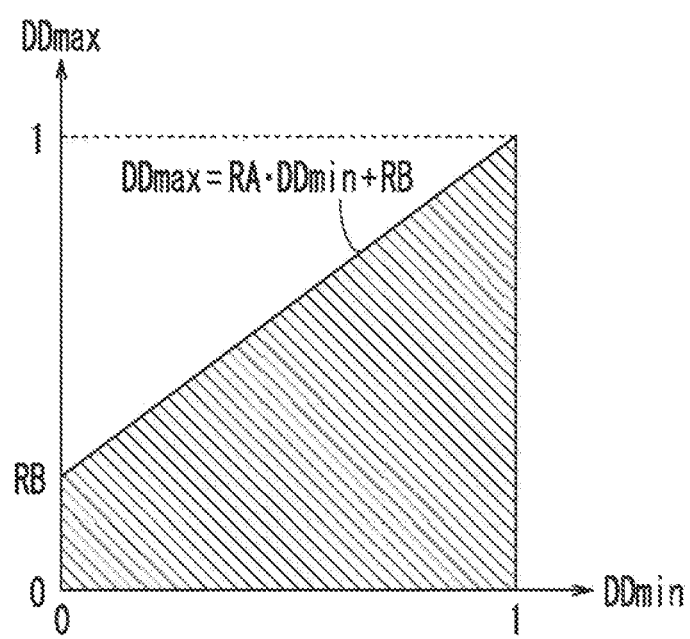
FIG. 2 is a diagram illustrating a parameter in the image display device according to the first embodiment.

For example, in a case of RB=1−RA, the range satisfying the expression (1) corresponds to a shaded area illustrated in FIG. 2. As described above, the parameters RA and RB designate the range of the maximum value DDmax in accordance with the minimum value DDmin. As represented by Expression (1), the range of the maximum value of driving image data in one frame period is determined in accordance with the minimum value of the driving image data in the one frame period. Thus, it is possible to suppress the change of image data after conversion in one frame period and to improve color reproduction.

As described above, the parameter WBR designates the luminance of the light source 27 which is used when a white subframe is displayed and is provided in the backlight 25, and takes a value in a range of $0 \leq WBR \leq 1$. The display unit 20 controls the luminance of the light source 27 in accordance with the parameter WBR, when displaying a white subframe. More specifically, the backlight driving circuit 23 in the display unit 20 controls the luminance of the light source 27 when a white subframe is displayed, to be WBR times the luminance of the light source 27 when other subframes are displayed, in accordance with the parameter WBR.

Figure 3:
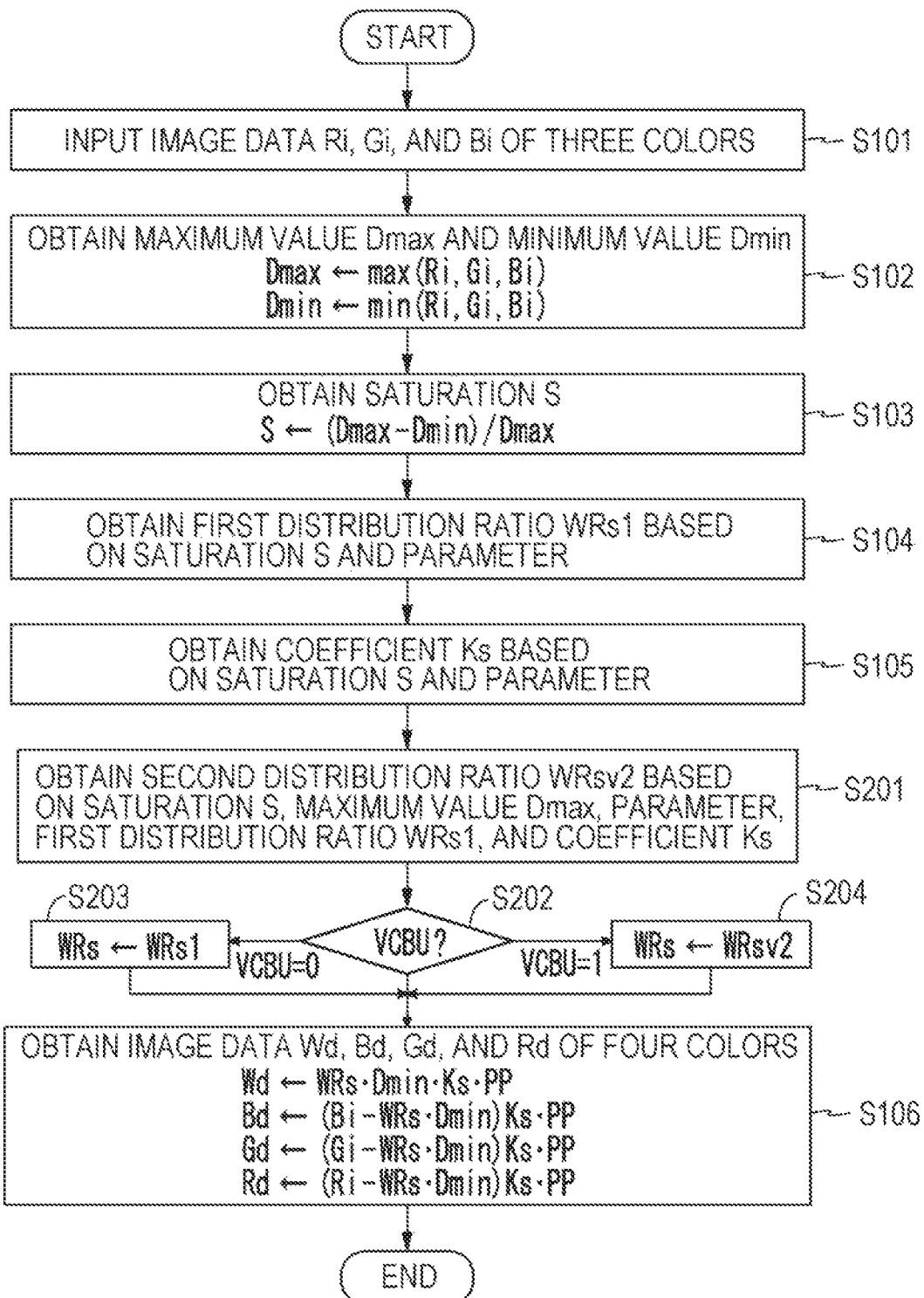
FIG. 3 is a flowchart illustrating image-data conversion processing in the image display device according to the first embodiment.

FIG. 3 is a flowchart illustrating image-data conversion processing. The processing illustrated in FIG. 3 is performed on data of each pixel, which is included in input image data D1. Processing on image data Ri, Gi, and Bi of three colors will be described below on the assumption that red image data, green image data, and blue image data (BGR pixel data values of an input image) of a pixel, which are included in input image data D1 are respectively set as Ri, Gi, and Bi, and white image data (driving WBGR pixel data values), blue image data, green image data, and red image data of the pixel, which are included in driving image data D2 are respectively set as Wd, Bd, Gd, and Rd.

As illustrated in FIG. 3, the image data Ri, Gi, and Bi of three colors are input to the image data conversion unit 10 (Step S101). Then, the statistical value-and-saturation computation unit 12 obtains the maximum value Dmax and the minimum value Dmin of the image data Ri, Gi, and Bi of the three colors (Step S102). Then, the statistical value-and-saturation computation unit 12 obtains a saturation S by the following expression (2), based on the maximum value Dmax and the minimum value Dmin (Step S103).

$$S=(Dmax-Dmin)/Dmax \quad (2)$$

Here, in the expression (2), S is set to 0 when Dmax is 0.

The distribution ratio-and-coefficient computation unit 13 obtains a distribution ratio of a white subframe by a calculation expression (which will be described later), based on the saturation S and the parameter WRX (Step S104). The distribution ratio obtained at this time is referred to as "a first distribution ratio WRs1" below.

The distribution ratio-and-coefficient computation unit 13 obtains the coefficient Ks by a calculation expression (which will be described later) based on the saturation S and the parameters WRX, RA, RB, and WBR (Step S105). When the distribution ratio-and-coefficient computation unit 13 obtains the first distribution ratio WRs1 in Step S104 and obtains the coefficient Ks in Step S105, the distribution ratio-and-coefficient computation unit 13 obtains the maximum value (or a value smaller than the maximum value) allowed to be taken by the coefficient Ks under a condition in which the first distribution ratio WRs1 is used, and the maximum value Dmax of the input image data D1 is set as Maximum Value 1 allowed to be taken by the input image data D1.

Then, the distribution ratio-and-coefficient computation unit 13 obtains a second distribution ratio WRsv2 by an expression (which will be described later) based on the saturation S, the maximum value Dmax, the first distribution ratio WRs1, the coefficient Ks, and the parameters RA, RB, WBR, and WRZ (Step S201).

Then, the distribution ratio-and-coefficient computation unit 13 performs condition branching in accordance with the parameter VCBU (Step S202). The parameter VCBU indicates whether or not color-breakup handling processing is performed, and takes a value of 0 or 1. The value of 0 indicates that the color-breakup handling processing is not performed. The value of 1 indicates that the color-breakup handling processing is performed. The distribution ratio-and-coefficient computation unit 13 causes the process to Step S203 at time of VCBU=0 and to proceed to Step S204 at time of VCBU=1. In the former case, the distribution ratio-and-coefficient computation unit 13 outputs the first distribution ratio WRs1 obtained in Step S104, as a distribution ratio WRs of a white subframe (Step S203). In the latter case, the distribution ratio-and-coefficient computation unit 13 outputs the second distribution ratio WRsv2 obtained in Step S201, as the distribution ratio of the white subframe (common-color distribution ratio) WRs (Step S204).

The driving image-data operation unit 33 obtains image data Wd, Bd, Gd, and Rd of four colors based on the image data Ri, Gi, and Bi of the three colors, the minimum value Dmin, the distribution ratio WRs, the coefficient Ks, and the parameter WBR by the following expressions (5a) to (5d) (Step S106).

$$Wd=WRs \cdot Dmin \cdot Ks \cdot PP/WBR \quad (5a)$$

$$Bd=(Bi-WRs \cdot min)Ks \cdot PP \quad (5b)$$

$$Gd=(Gi-WRs \cdot Dmin)Ks \cdot PP \qquad (5c)$$

$$Rd=(Ri-WRs \cdot Dmin)Ks \cdot PP \qquad (5d)$$

Here, in the expressions (5a) to (5d), PP indicates a value (=P/Pmax) obtained by dividing the maximum value P for gradation constraint by the maximum value Pmax of the gradation. In the following descriptions, PP=1 is assumed.

The driving image-data operation unit 33 obtains the image data Wd, Bd, Gd, and Rd of the four colors based on the first distribution ratio WRs1, at time of VCBU=0. The driving image-data operation unit 33 obtains the image data Wd, Bd, Gd, and Rd of the four colors based on the second distribution ratio WRsv2, at time of VCBU=1. In this manner, the image data conversion unit 10 does not perform color-breakup handling processing at time of VCBU=0, and performs the color-breakup handling processing at time of VCBU=1.

<1.3 Method of Determining Function of Obtaining First Distribution Ratio WRs1>

The saturation S and the distribution ratio WRs take values of 0 to 1. The maximum value of blue image data Bd, green image data Gd, and red image data Rd which are included in the driving image data D2 is set as Ddmax, and the minimum value thereof is set as Ddmin. When PP is 1, Wd, Ddmax, and Ddmin are given by the following expressions (6a) to (6c), respectively.

$$Wd=WRs \cdot Dmin \cdot Ks/WBR \qquad (6a)$$

$$Ddmax=(Dmax-WRs \cdot Dmin)Ks \qquad (6b)$$

$$Ddmin=(Dmin-WRs \cdot Dmin)Ks \qquad (6c)$$

The following expression (7a) is derived by solving the expression of Wd>Ddmax in consideration of Dmax=Dmin/(1−S). The following expression (7b) is derived by solving the expression of Wd<Ddmin.

$$WRs>WBRo/(1-S) \qquad (7a)$$

$$WRs<WBRo \qquad (7b)$$

Here, in the expressions (7a) and (7b), WBRo satisfies WBR/(1+WBR).

Figure 4:
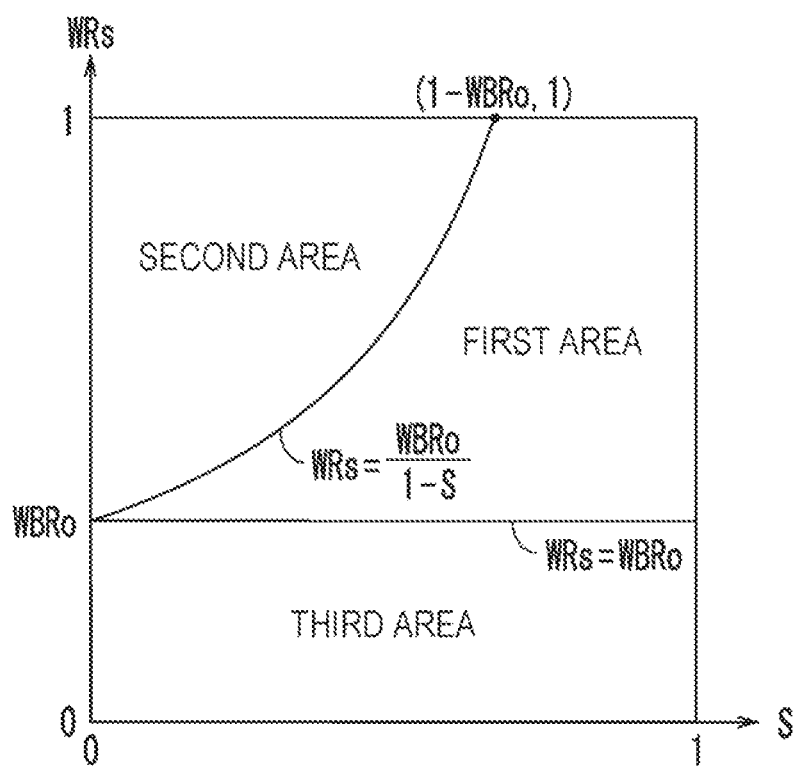
FIG. 4 is a diagram illustrating a range of a saturation and a distribution ratio of a white subframe in the image display device according to the first embodiment.

FIG. 4 is a diagram illustrating a range of the saturation S and the distribution ratio WRs. The range of (S, WRs) illustrated in FIG. 4 is divided into a first area in which Ddmin<Wd<Ddmax is satisfied, a second area in which Ddmax<Wd is satisfied, and a third area in which Wd<Ddmin is satisfied.

As described above, in a case where color-breakup handling processing is not performed (in a case of VCBU=0), the first distribution ratio WRs1 is used as the distribution ratio WRs of the white subframe (Steps S202 and S203 in FIG. 3). The distribution ratio-and-coefficient computation unit 13 has a function of obtaining the first distribution ratio WRs1 based on the saturation S. The function changes depending on the parameters WRX, RA, RB, and WBR stored in the parameter storage unit 11. Details of the function will be described below. In a first example and a second example described below, the parameter WRX takes a value in a range of ½≤WRX≤1.

In the first example, the distribution ratio-and-coefficient computation unit 13 obtains the first distribution ratio WRs1 by the following expression (17).

$$WRs1=\min(WBRo/(1-S),WRX) \qquad (17)$$

In the expression (17), WBRo is ½.

Figure 5:
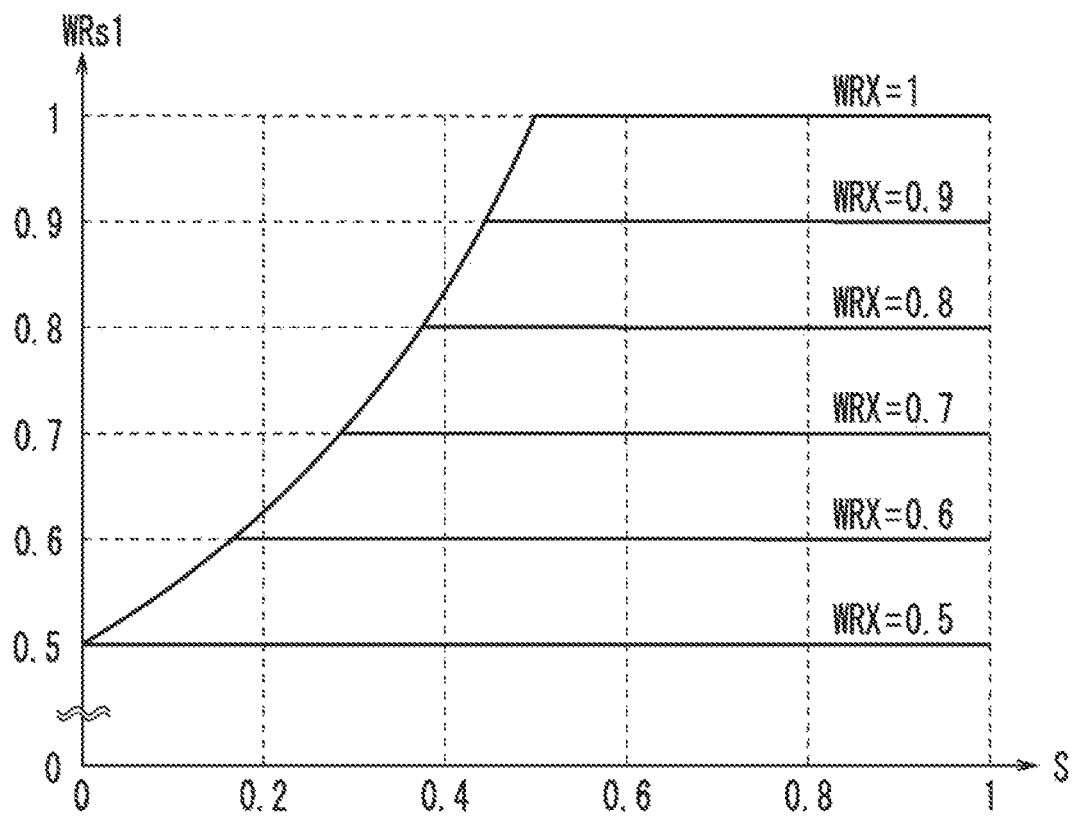
FIG. 5 is a diagram illustrating a graph of a first distribution ratio WRs1 according to a first example of the first embodiment.

FIG. 5 is a diagram illustrating a graph of the first distribution ratio WRs1 according to the first example. The graph illustrated in FIG. 5 is normally in the first area. It is possible to set a difference between image data Wd, Bd, Gd, and Rd of the four colors to be the minimum, by using the first distribution ratio WRs1 as the distribution ratio WRs of the white subframe.

In a case where the response rate of the pixel 26 becomes slower as the display gradation becomes lower, the parameter WRX is set to a value close to 1, and the white image data Wd is set to approach the maximum value Ddmax. In a case where the response rate of the pixel 26 becomes slower as the display gradation becomes higher, the parameter WRX is set to a value close to 0.5, and the white image data Wd is set to approach the minimum value Ddmin. As described above, if the parameter WRX is set in accordance with the response characteristics of the pixel 26, it is possible to improve color reproduction of the image display device 1 by displaying the gradation with the higher response rate.

In the second example, the distribution ratio-and-coefficient computation unit 13 obtains the first distribution ratio WRs1 by the following expressions (18a) to (18c).

a) Time of WRX≥Ts and 1−S<WBRx $$WRs1=WRX-WRX(1-S)^2/(3 \cdot WBRx^2) \qquad (18a)$$

b) Time of WRX≥Ts and 1−S≥WBRx $$WRs1=WBRo/(1-S) \qquad (18b)$$

c) Time of WRX<Ts $$WRs1=(WBRo-WRX)(1-S)^2+WRX \qquad (18c)$$

In the expressions (18a) to (18c), WBRo is ½, Ts is ¾, and WBRx is 3/(4WRX).

Figure 6:
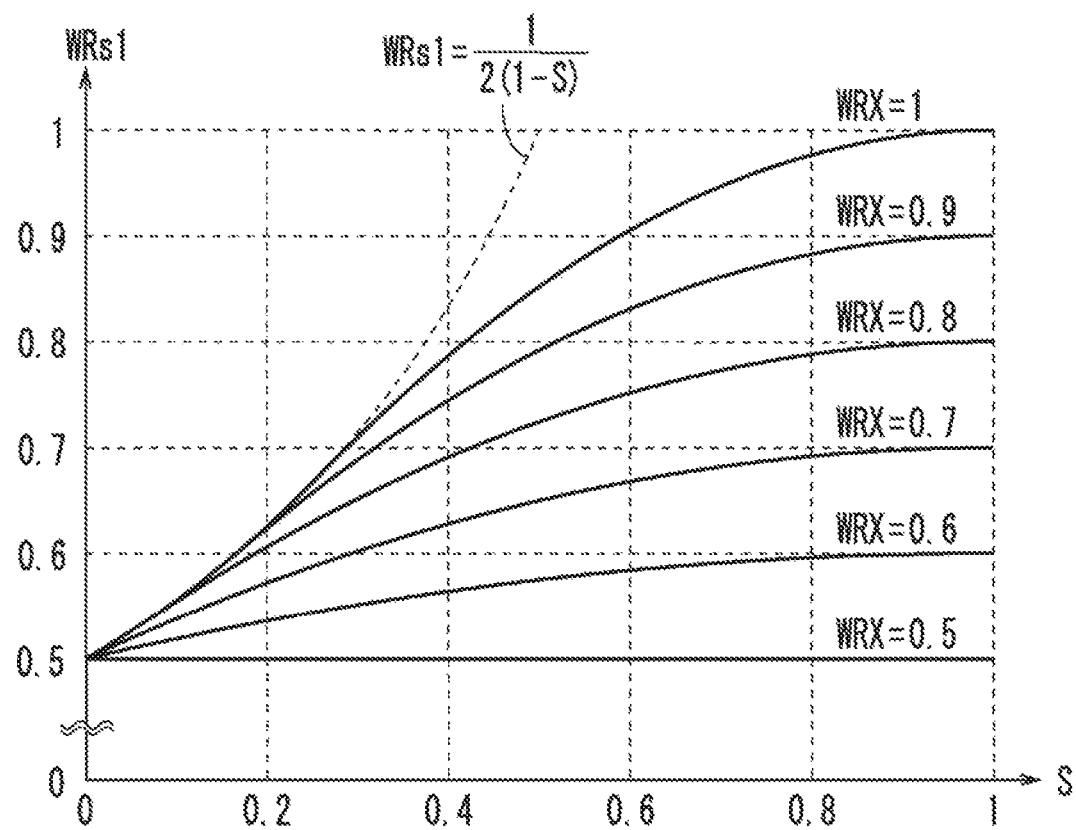
FIG. 6 is a diagram illustrating a graph of a first distribution ratio WRs1 according to a second example of the first embodiment.

FIG. 6 is a diagram illustrating a graph of the first distribution ratio WRs1 according to the second example. A function of obtaining the first distribution ratio WRs1 at time of WRX<Ts(=¾) is a quadratic function which takes a value of WBRo(=½) at time of S=0 and takes the maximum value WRX at time of S=1. A function of obtaining the first distribution ratio WRs1 at time of WRX≥Ts is a fractional function WRs1=1/{2(1−S)} at time of 1−S≥WBRx and is a quadratic function which takes a value of maximum value WRX at time of 1−S<WBRx and S=1. The latter function is determined such that the graph of the former function is tangent to the graph of the latter function at a point (WBRx, WBRo/(1−WBRx)). The graph illustrated in FIG. 6 is normally in the first area. It is possible to set a difference between image data Wd, Bd, Gd, and Rd of the four colors to be the minimum, by using such a first distribution ratio WRs1 as the distribution ratio WRs of the white subframe.

In the second example, in a case where the response rate of the pixel 26 becomes slower as the display gradation becomes lower, the parameter WRX is also set to a value close to 1. In a case where the response rate of the pixel 26 becomes slower as the display gradation becomes higher, the parameter WRX is also set to a value close to 0.5. Thus, similar to the first example, it is possible to improve color reproduction of the image display device 1.

In the first example, when WRX is not 0.5, the function of obtaining the first distribution ratio WRs1 does not smoothly change in the vicinity of S=1−WBRo/WRX. In the second example, the function smoothly changes in a range of 0<S<1. Thus, according to the second example, it is possible to prevent distortion of an image when a gradation image is displayed.

Features and effects of a case where the first distribution ratio WRs1 is used as the distribution ratio WRs of the white subframe in the first example and the second example will be described below. In the first and second examples, the distribution ratio-and-coefficient computation unit 13 obtains the distribution ratio WRs so as to cause (S, WRs) to be in the first area. The first area indicates a range satisfying Ddmin<Wd<Ddmax, that is, a range in which white image data Wd is in a range from the minimum value Ddmin of blue image data Bd, green image data Gd, and red image data Rd to the maximum value Ddmax thereof. As described above, since the distribution ratio WRs is obtained so as to cause the white image data Wd to be in the range from the minimum value Ddmin of blue image data Bd, green image data Gd, and red image data Rd to the maximum value Ddmax thereof, it is possible to suppress the change of luminance of the pixel 26 in one frame period and to improve color reproduction of the image display device 1.

In the first and second examples, the distribution ratio-and-coefficient computation unit 13 obtains the distribution ratio WRs increasing as the saturation S becomes greater. Thus, it is possible to suppress the occurrence of color breakup by setting the ratio of the value distributed to the white subframe to increase as the saturation S becomes greater.

In the second example, the distribution ratio-and-coefficient computation unit 13 obtains the distribution ratio WRs in accordance with the function which smoothly changes depending on the saturation S. Thus, it is possible to prevent distortion of an image when a gradation image is displayed. In this specification, "the function that smoothly changes" means, for example, a function of a differential coefficient continuously changing. However, it is not limited thereto. The function may be a smooth function without an inflection point. That is, in a case where, even though the differential coefficient of a function is discontinuous, a problem on display does not occur because the extent of discontinuity is sufficient small, this function may be considered as "the function that smoothly changes".

In the first example and the second example, at time of S=0, WRs is 0.5, and Wd=Bd=Gd=Rd is established. As described above, the distribution ratio-and-coefficient computation unit 13 obtains the distribution ratio WRs such that the white image data Wd, the blue image data Bd, the green image data Gd, and the red image data Rd are equal to each other at time of S=0. Thus, it is possible to prevent an occurrence of a situation in which the luminance of the pixel 26 in one frame period changes when the saturation S is zero.

<1.4 Regarding Adjustment Coefficient Ks>

The adjustment coefficient Ks will be described below (Step S104 in FIG. 3).

As illustrated in FIG. 4 and described above, the range of (S, WRs), which is indicated by the saturation S and the distribution ratio WRs is divided into the first area in which Ddmin<Wd<Ddmax is satisfied, the second area in which Ddmax<Wd is satisfied, and the third area in which Wd<Ddmin is satisfied.

In a case where (S, WRs) is in the first area, DDmin is Ddmin, and DDmax is Ddmax. Considering the expressions (6a) and (6b), if the expression (1) is solved by substituting Dmin=Dmax(1−S) into the expression (1), the following expression (20) is derived.

$$Ks \leq RB/(D\max \times [1-\{WRs(1-RA)+RA\}(1-S)]) \quad (20)$$

The coefficient Ks is determined as with the following expression (21) so as to establish the expression (20) even when the maximum value Dmax is 1 (maximum value which may be taken by the input image data D1). The expression (21) represents the maximum value which may be taken by the coefficient Ks under a condition of Dmax=1, in a case where (S, WRs) is in the first area.

$$Ks = RB/[1-\{WRs(1-RA)+RA\}(1-S)] \quad (21)$$

The maximum value Dmax indicates a brightness Vi of the input image data D1. The brightness Vi=Dmax=max(Ri, Gi, Bi) may be referred to as "an input brightness Vi" below in order to be distinguished from the brightness V=Ks·Dmax after amplification and compression processing described later.

In a case where the distribution ratio WRs is determined to cause (S, WRs) to be in the first area, the expression of Ddmin<Wd<Ddmax is established, and a difference between image data Wd, Bd, Gd, and Rd of four colors included in the driving image data D2 becomes the minimum (even in a case of the maximum, (Ddmax−Ddmin) is established). In this case, the maximum value which may be taken by the coefficient Ks under a condition in which the distribution ratio WRs is used and Dmax is 1 is given by the expression (21). As (S, WRs) becomes closer to a boundary line between the first and second areas, the white image data Wd approaches the maximum value Ddmax. As (S, WRs) becomes closer to a boundary line between the first and third areas, the white image data Wd approaches the minimum value Ddmin.

In a case where (S, WRs) is in the second area, DDmin is Ddmin, and DDmax is Wd. Considering the above expressions, the expressions (6a) and (6c), and Dmin=Dmax(1−S), the following expression (22) by the expression (1) is derived.

$$Ks \leq WBR \cdot RB/[D\max(1-S)\{WRs(1+WBR \cdot RA)-RA)-RA \cdot WBR\}] \quad (22)$$

The coefficient Ks is determined as with the following expression (23) so as to establish the expression (22) even when the maximum value Dmax indicating the input brightness Vi is 1 (maximum value which may be taken by the input image data D1). The expression (23) represents the maximum value which may be taken by the coefficient Ks under a condition of Dmax=1, in a case where (S, WRs) is in the second area.

$$Ks = WBR \cdot RB/[\{WRs(1+WBR \cdot RA)-RA \cdot WBR\}(1-S)] \quad (23)$$

In a case where (S, WRs) is in the third area, DDmin is Wd, and DDmax is Ddmax. Considering the expressions, the expressions (6a) and (6b), and Dmin=Dmax(1−S), the following expression (24) by the expression (1) is derived.

$$Ks \leq WBR \cdot RB/[D\max\{WBR-(WBR+RA)WRs(1-S)\}] \quad (24)$$

The coefficient Ks is determined as with the following expression (25) so as to establish the expression (24) even when the maximum value Dmax indicating the input brightness Vi is 1 (maximum value which may be taken by the input image data D1). The expression (24) represents the maximum value which may be taken by the coefficient Ks under a condition of Dmax=1, in a case where (S, WRs) is in the third area.

$$Ks = WBR \cdot RB/\{WBR-(WBR+RA)WRs(1-S)\} \quad (25)$$

<1.5 First Distribution Ratio WRs1 and Adjustment Coefficient Ks According to Modification Examples>

Another examples of the function of obtaining the distribution ratio WRs and the function of obtaining the coefficient Ks will be described below, as modification examples. The parameters RA, RB, and WBR have values in ranges of $0 \leq RA \leq 1$, $0 \leq RB \leq 1$, and $0 \leq WBR \leq 1$, respectively. In a first modification example and a second modification example described below, the parameter WRX takes a value in a range of $WBRo \leq WRX \leq 1$.

In the first modification example, the distribution ratio-and-coefficient computation unit 13 obtains the first distribution ratio WRs1 by the expression (26) and obtains the coefficient Ks by the expression (21).

$$WRs1 = \min(WBRo/(1-S), WRX) \quad (26)$$

Figure 7:
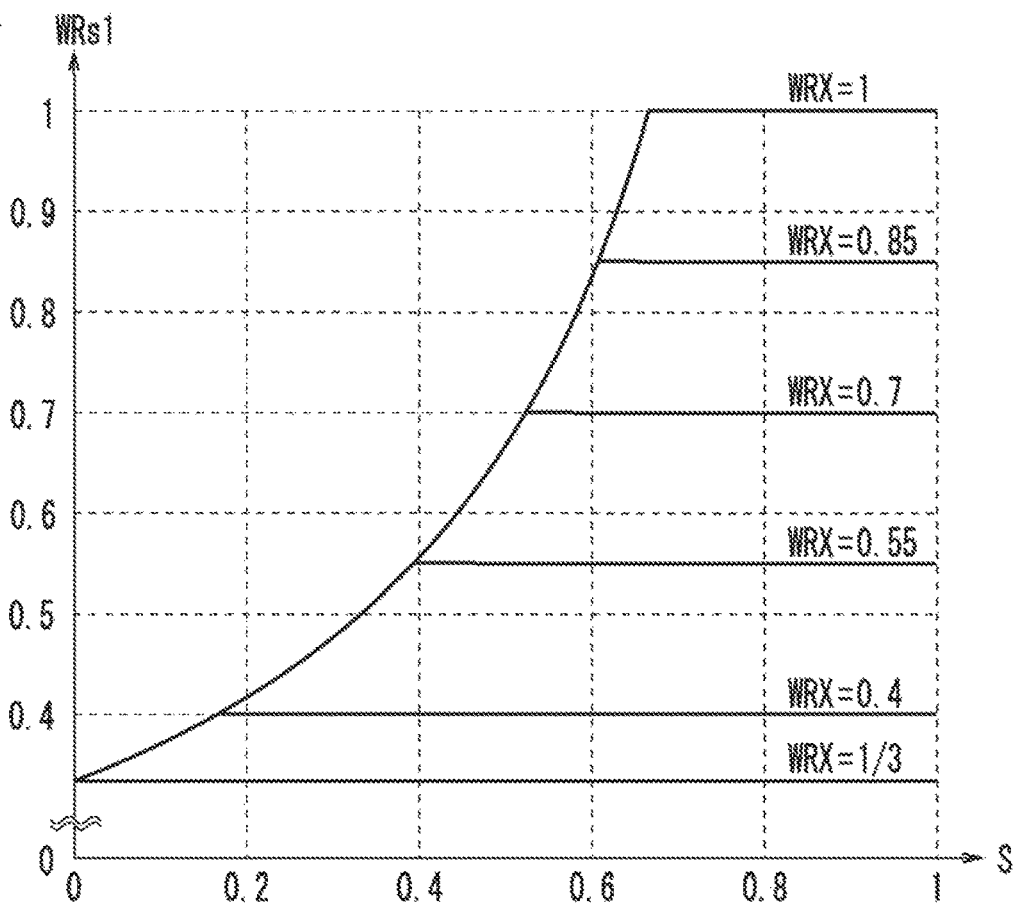
FIG. 7 is a diagram illustrating a graph of a first distribution ratio WRs1 according to a first modification example of the first embodiment.
Figure 8:
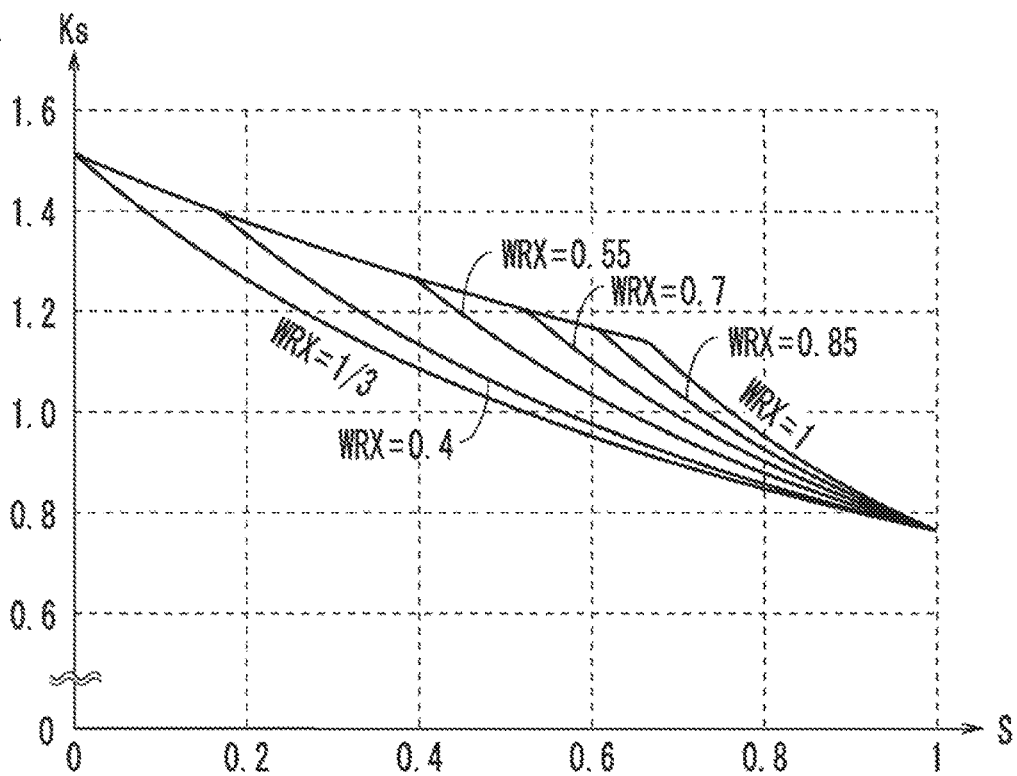
FIG. 8 is a diagram illustrating a graph of an adjustment coefficient Ks according to the first modification example of the first embodiment.

In the expression (26), WBRo satisfies $WBR/(1+WBR)$. FIG. 7 is a diagram illustrating a graph of the first distribution ratio WRs1 according to the first modification example. FIG. 8 is a diagram illustrating a graph of the coefficient Ks according to the first modification example. In the graphs illustrated in FIGS. 7 and 8, $RA=0.25$, $RB=0.75$, and $WBR=0.5$ are set. According to the first modification example, that is, if the coefficient Ks in the expression (21) is used, and the first distribution ratio WRs1 in the expression (26) is set as the distribution ratio WRs of the white subframe, effects similar to those in the first example in the embodiment are obtained.

Figure 9:
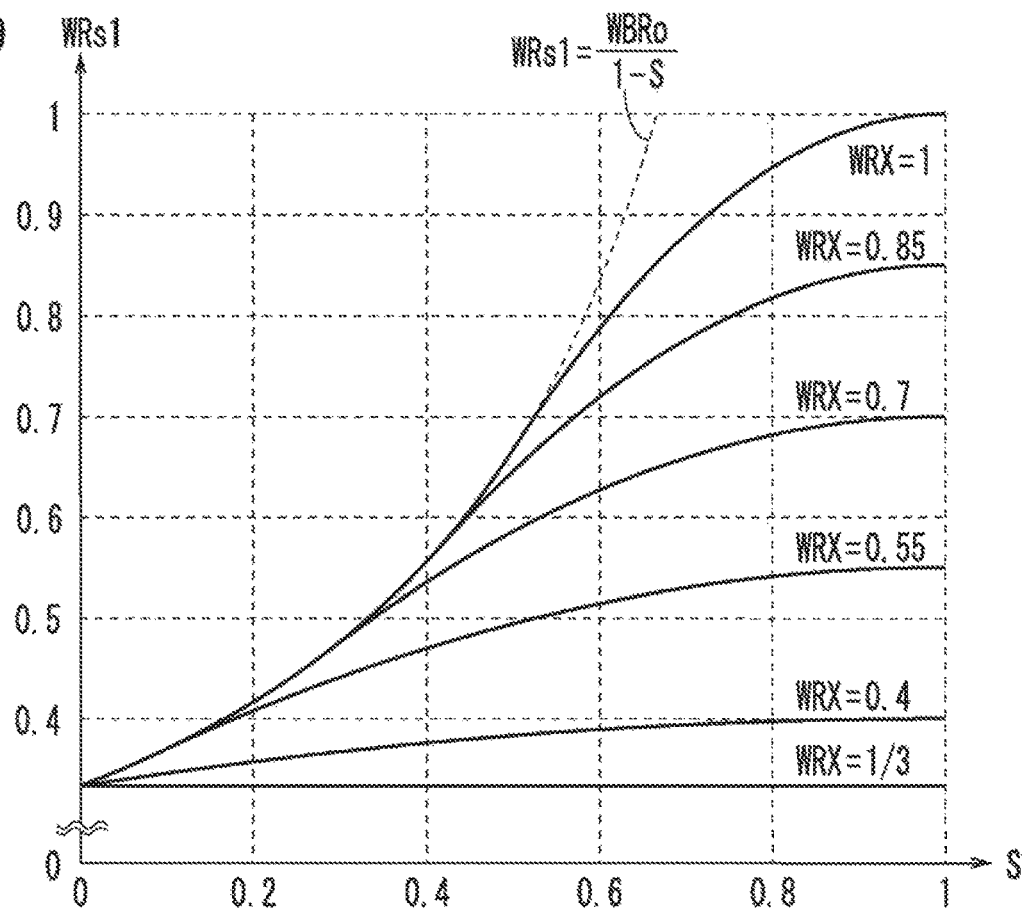
FIG. 9 is a diagram illustrating a graph of a first distribution ratio WRs1 according to a second modification example of the first embodiment.
Figure 10:
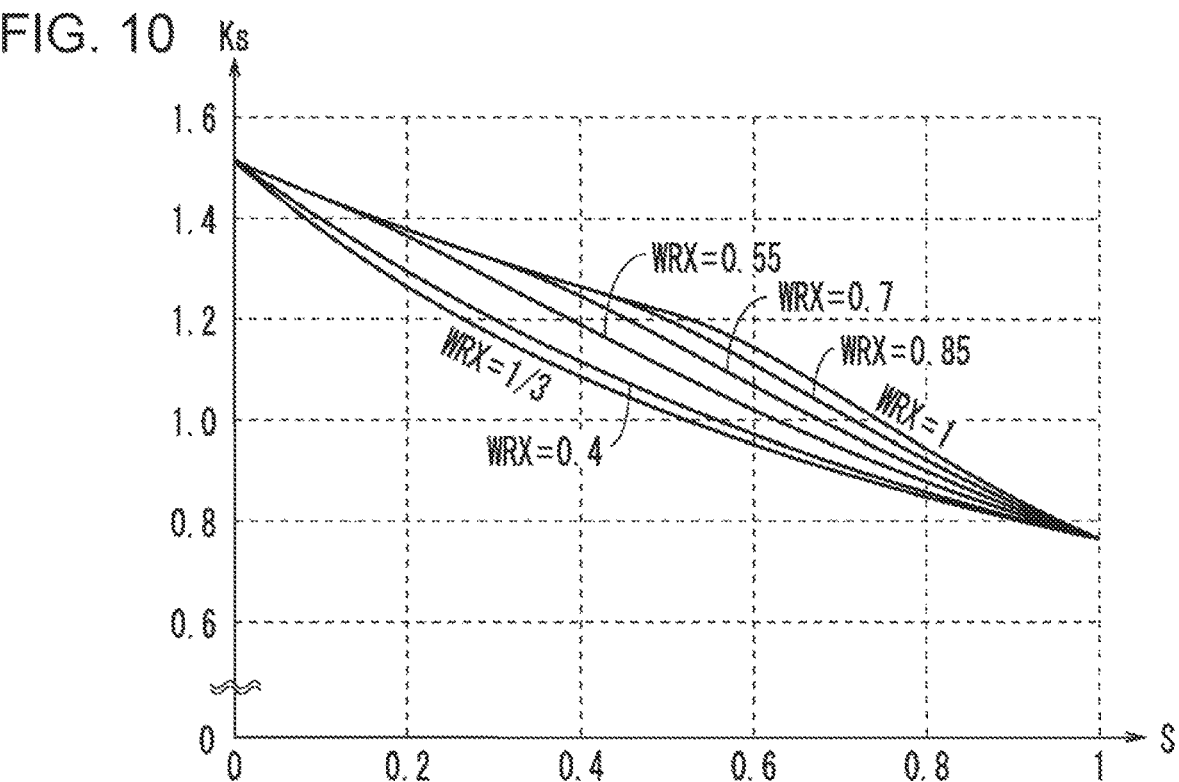
FIG. 10 is a diagram illustrating a graph of an adjustment coefficient Ks according to the second modification example of the first embodiment.

In the second modification example, the distribution ratio-and-coefficient computation unit 13 obtains the first distribution ratio WRs1 by the expressions (18a) to (18c) and obtains the coefficient Ks by the expression (21). In the expressions (18a) to (18c), WBRo is $WBR/(1+WBR)$, Ts is $3WBRo/2$, and WBRx is $3WBR/\{2WRX(1+WBR)\}$. FIG. 9 is a diagram illustrating a graph of the first distribution ratio WRs1 according to the second modification example. FIG. 10 is a diagram illustrating a graph of the coefficient Ks according to the second modification example. In the graphs illustrated in FIGS. 9 and 10, $RA=0.25$, $RB=0.75$, and $WBR=0.5$ are set. According to the second modification example, that is, if the coefficient Ks in the expression (21) is used, and the first distribution ratio WRs1 in the expressions (18a) to (18c) is set as the distribution ratio WRs of the white subframe, effects similar to those in the second example in the embodiment are obtained.

<1.6 Method of Determining Function of Obtaining Second Distribution Ratio WRsv2>

A calculation expression of obtaining the second distribution ratio WRsv2 will be described below (Step S201 in FIG. 3). In the following descriptions, calculation is performed in consideration of $V=Dmax \cdot Ks$ and $Dmin=Dmax(1-S)$. Here, Dmax indicates the input brightness Vi, and V indicates a brightness after amplification and compression processing (also referred to as "an adjusted brightness" below). In a case where (S, WRs1) is in the first area illustrated in FIG. 4, DDmin is Ddmin, and DDmax is Ddmax. Thus, the minimum value WRsva of the second distribution ratio WRsv2 in this case is given by the following expression (27a) with $Ddmax \leq RA \cdot Ddmin+RB$. In a case where (S, WRs1) is in the second area illustrated in FIG. 4, DDmin is Ddmin, and DDmax is Wd. Thus, the maximum value WRsvb of the second distribution ratio WRsv2 in this case is given by the following expression (27b) with $Wd \leq RA \cdot Ddmin+RB$. In a case where (S, WRs1) is in the third area illustrated in FIG. 4, DDmin is Wd, and DDmax is Ddmax. Thus, the minimum value WRsvc of the second distribution ratio WRsv2 in this case is given by the following expression (27c) with $Ddmax \leq RA \cdot Wd+RB$.

$$WRsva = RA/(RA-1)+(RB-V)/\{(RA-1)V(1-S)\} \quad (27a)$$

$$WRsvb = WBR \cdot RA/(1+WBR \cdot RA)+WBR \cdot RB/\{(1+WBR \cdot RA)V(1-S)\} \quad (27b)$$

$$WRsvc = WBR(V-RB)/\{(WBR+RA)V(1-S)\} \quad (27c)$$

When the second distribution ratio WRsv2 is obtained, in a case where (S, WRs1) is in the first area illustrated in FIG. 4, the second distribution ratio WRsv2 is set to be equal to or greater than the value WRsva shown in the expression (27a). In a case where (S, WRs1) is in the second area illustrated in FIG. 4, the second distribution ratio WRsv2 is set to be equal to or smaller than the value WRsvb shown in the expression (27b). In a case where (S, WRs1) is in the third area illustrated in FIG. 4, the second distribution ratio WRsv2 is set to be equal to or greater than the value WRsvc shown in the expression (27c). Considering that the second distribution ratio WRsv2 takes a value in a range of $0 \leq WRsv2 \leq 1$, the second distribution ratio WRsv2 is determined to satisfy the following expression (28).

$$\max(0, WRsva, WRsvc) \leq WRsv2 \leq \min(1, WRsvb) \quad (28)$$

Figure 11:
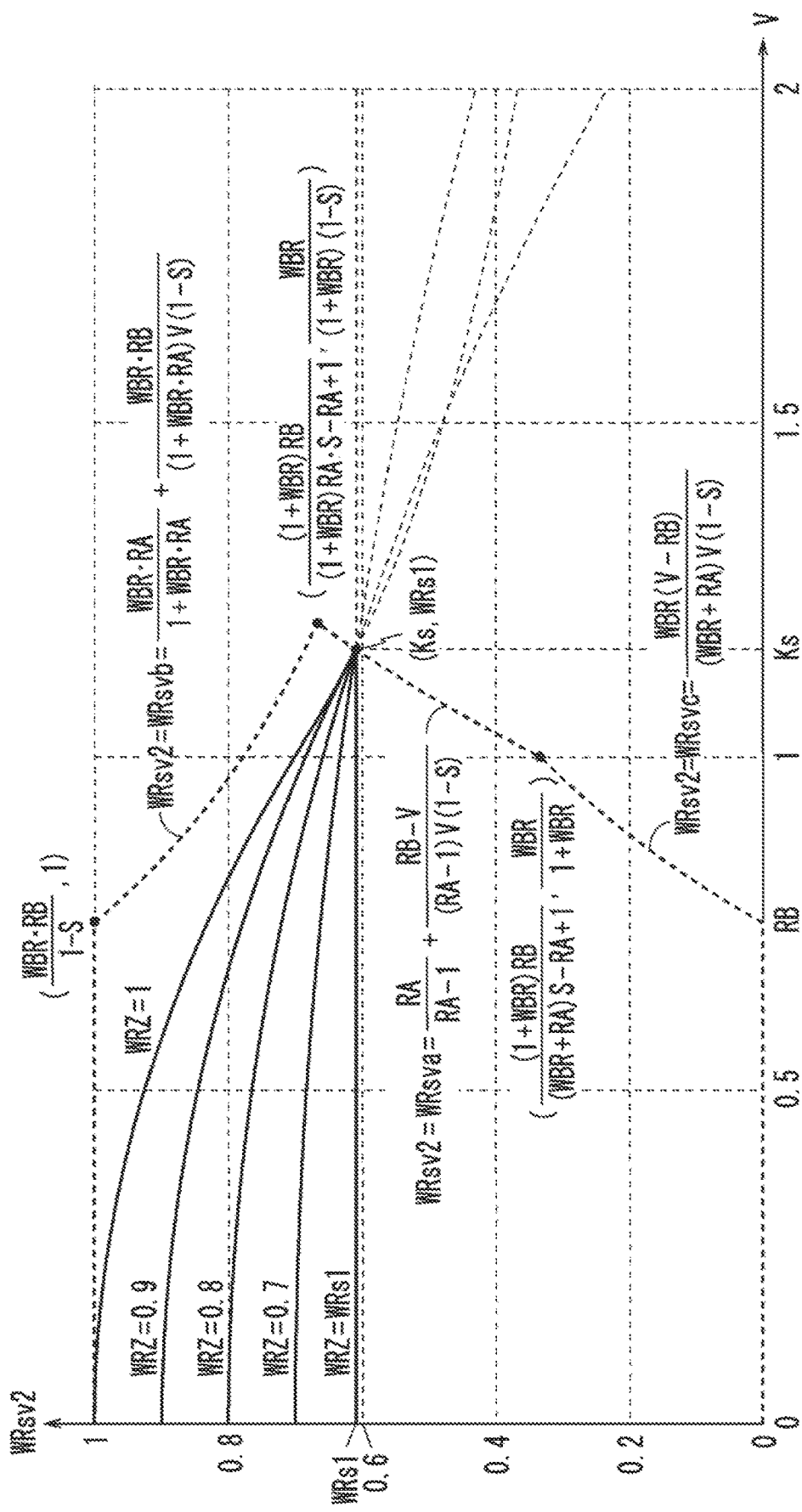
FIG. 11 is a diagram illustrating a method of determining a function of obtaining a second distribution ratio WRsv2 of a white subframe in the image display device according to the first embodiment.

FIG. 11 is a diagram illustrating a method of determining a function of obtaining WRsv2. A curved line illustrated by a solid line in FIG. 11 indicates the second distribution ratio WRsv2 at time of $S=0.5$. Here, $RA=0.25$, $RB=0.75$, $WBR=0.5$, and $WRX=0.75$ are set. The distribution ratio-and-coefficient computation unit 13 obtains the first distribution ratio WRs1 by the expressions (18a) to (18c) and obtains the coefficient Ks by the expression (21).

A portion surrounded by a bold broken line in FIG. 11 indicates a range of the adjusted brightness (brightness after amplification and compression processing) V and the second distribution ratio WRsv2 satisfying the expression (28). The function of obtaining the second distribution ratio WRsv2 is determined such that the graph of the function is in the range surrounded by the bold broken line illustrated in FIG. 11.

For example, the function of obtaining the second distribution ratio WRsv2 when the coefficient Ks is smaller than a predetermined value Tsv is set to be a quadratic function which takes the maximum value WRZ at time of $V=0$ and takes a value WRs1 at time of $V=Ks$. The function of obtaining the second distribution ratio WRsv2 when the coefficient Ks is equal to or greater than the predetermined value Tsv is set to be a quadratic function which takes the maximum value WRZ at time of $V=0$ under a condition of $V<Tsv$. This function is set to be a fractional function which can be expressed as $WRsv2=A/V+B$ under a condition of $V \geq Tsv$ and takes the value WRs1 at time of $V=Ks$ (A indicates $WBR \cdot RB/\{(1+WBR/RA)(1-S)\}$). The following expressions (29) and (30a) to (30c) are derived by determining two functions cause the graphs of the two functions to be tangent to each other at time of $V=Tsv$ (WRsv2 is set to WRs1 at time of $WRZ \leq WRs1$).

$$Tsv = 3 \cdot Ks \cdot WBRb/[2\{Ks(1-S)(WRZ-WRs1)+WBRb\}] \quad (29)$$

a) Time of $Ks \geq Tsv$ and $V \geq Tsv$ $$WRsv2 = WRs1+WBRb(Ks-V)/\{Ks(1-S)V\} \quad (30a)$$

b) Time of $Ks \geq Tsv$ and $V<Tsv$ $$WRsv2 = WRZ-WBRb \cdot V2/\{2(1-S)Tsv3\} \quad (30b)$$

c) Time of $Ks<Tsv$ $$WRsv2 = WRZ-(WRZ-WRs1)V2/Ks2 \quad (30c)$$

In the expressions (29) and (30a) to (30c), $WBRb=WBR \cdot RB/(1+WBR \cdot RA)$ and $V=Dmax \cdot Ks$ are established. The parameter WRZ takes a value in a range of $WRs \leq WRZ \leq 1$. V indicates the adjusted brightness (brightness after amplification and compression processing).

As illustrated in FIG. 11, the second distribution ratio WRsv2 increases as the adjusted brightness V becomes smaller. Therefore, at time of VCBU=1, the distribution ratio-and-coefficient computation unit 13 obtains the distribution ratio WRs increasing as the adjusted brightness V becomes smaller. Thus, it is possible to increase an effect of preventing the occurrence of color breakup, when the adjusted brightness V is small. At time of VCBU=1, the parameter WRZ is set to a value closer to the first distribution ratio WRs1 as the response rate of the pixel 26 becomes slower, and is set to a value closer to 1 as the response rate of the pixel 26 becomes faster. Thus, it is possible to obtain the preferable distribution ratio WRs in accordance with the response rate of the pixel 26 and to suppress the occurrence of color breakup.

<1.7 Effects of First Embodiment>

As described above, in the image display device 1 according to the embodiment, at time of VCBU=1, the distribution ratio-and-coefficient computation unit 13 obtains the tentative distribution ratio (first distribution ratio WRs1) and the coefficient Ks based on the saturation S and the parameters WRX, RA, RB, and WBR and obtains the distribution ratio WRs(second distribution ratio WRsv2) increasing as the adjusted brightness V becomes smaller, based on the adjusted brightness V (obtained by multiplying the maximum value Dmax of the input image data D1 by the coefficient Ks), the parameters RA, RB, WBR, and WRZ, the tentative distribution ratio, and the coefficient Ks, for each pixel. Thus, according to the image display device according to the embodiment, the more preferable distribution ratio WRs depending on the coefficient Ks is obtained, and thus it is possible to suppress the occurrence of color breakup while image display having high color reproduction is performed.

Figure 12:
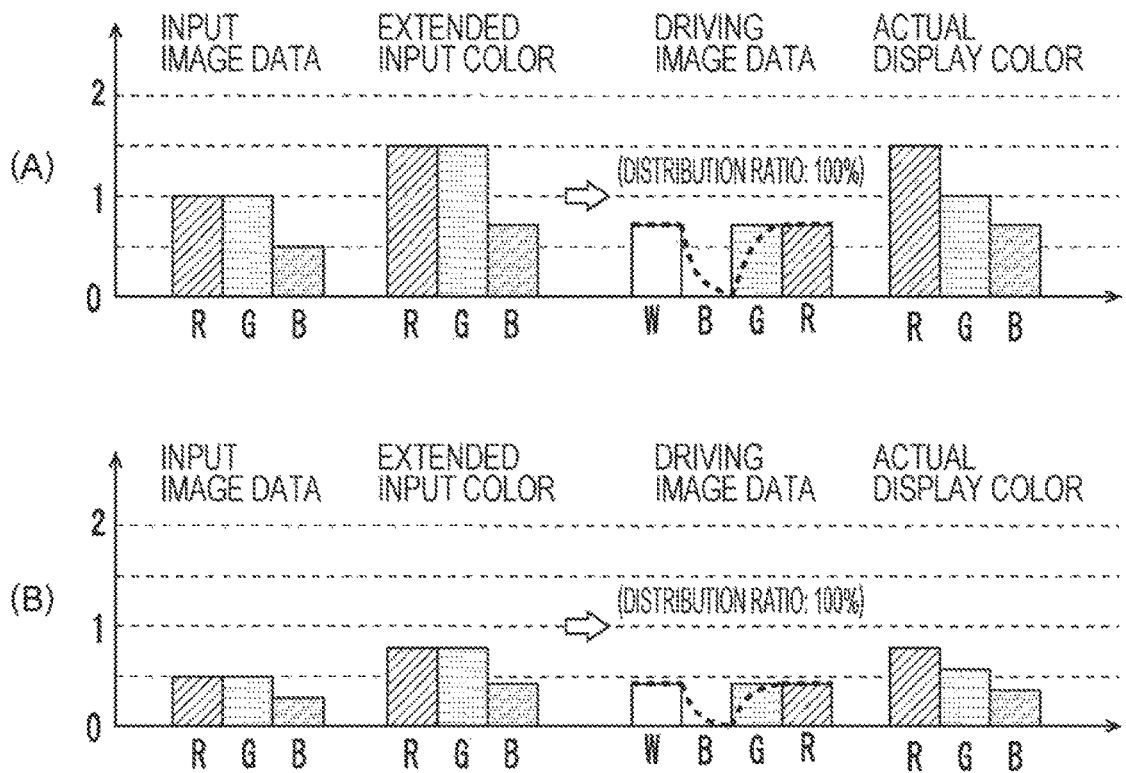
FIGS. 12(A) and 12(B) are diagrams illustrating an operation of a conventional example as a comparative example for describing effects of the first embodiment.
Figure 13:
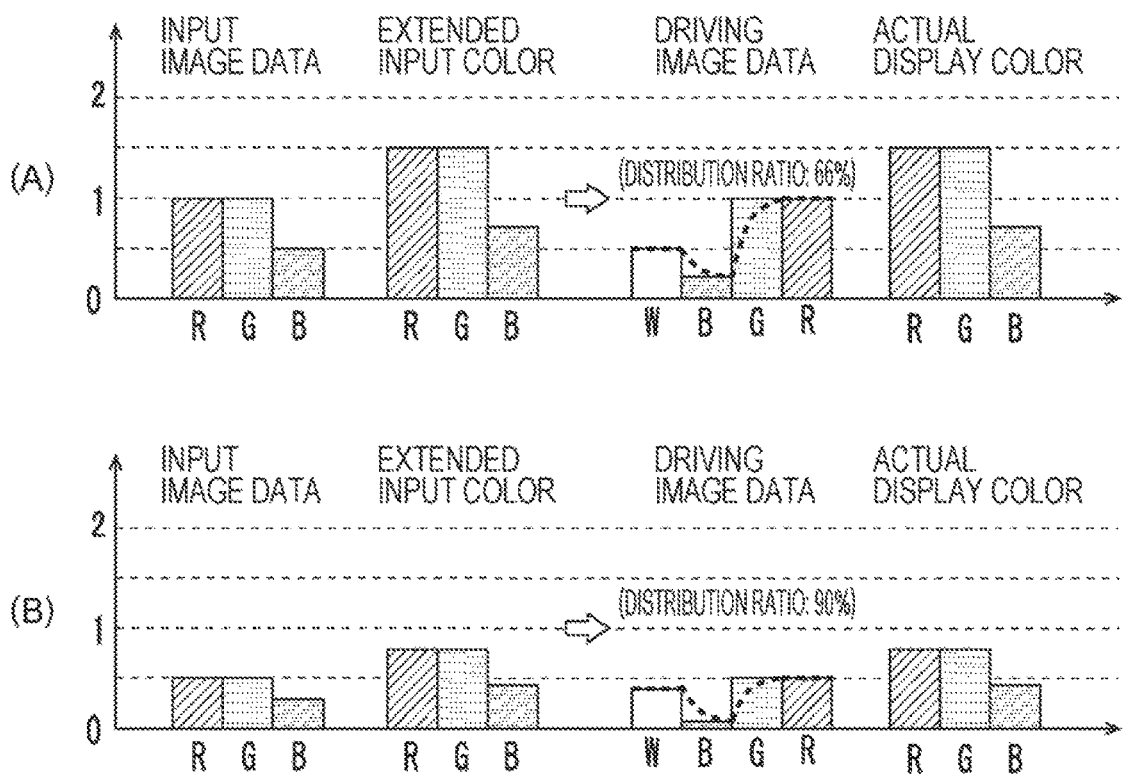
FIGS. 13(A) and 13(B) are diagrams illustrating the effects of the first embodiment.

The above-described effects in the embodiment will be specifically described with reference to FIGS. 12 and 13. FIG. 12 is a diagram illustrating an operation of a field sequential image display device in the related art (referred to as "a conventional example" below), in which the distribution ratio WRs of a white subframe as a common color subframe is fixed to 100%. The brightness (input brightness) of input image data in an operation example illustrated in FIG. 12(B) is smaller than an input brightness in an operation example illustrated in FIG. 12(A). A curved line illustrated by a bold dotted line for driving image data in FIG. 12 schematically indicates a response of a liquid crystal panel as a display device (similar in FIG. 13 described later). As understood from FIG. 12, in the conventional example, a difference in hue, saturation, and luminance occurs between an extended input color (color indicated by image data after amplification and compression processing) and an actual display color (color which is actually displayed in the display device), by the influence of the response characteristics of the display device. Thus, image display having sufficiently high color reproduction is not performed. On the contrary, the image display device 1 according to the embodiment operates on input image data which is the same as the input image data in the operation example in FIG. 12(A), as illustrated in FIG. 13(A). The image display device 1 operates on input image data which is the same as the input image data in the operation example in FIG. 12(B), as illustrated in FIG. 13(B). As described above, in the embodiment, in a case where color-breakup handling processing is performed (case of WRs=WRsv2), the distribution ratio WRs increases as the adjusted brightness V becomes smaller. In an operation example in FIG. 13(A), WRs is 66%. In an operation example in FIG. 13(B), WRs is 90%. In a case where the adjusted brightness V is small, a gradation difference between subframes (difference between WBGR pixel data values) is small. Thus, an influence of the response characteristics of the display device is small. Therefore, according to the embodiment, since a difference in any of hue, saturation, and luminance between the extended input color and the actual display color is reduced, it is possible to suppress the occurrence of color breakup while image display having high color reproduction is performed.

In the embodiment, in Step S106, the driving image-data operation unit 33 obtains image data Wd, Bd, Gd, and Rd of the four colors by the expressions (5a) to (5d), based on the image data Ri, Gi, and Bi of the three colors, the minimum value Dmin, the distribution ratio WRs, the adjustment coefficient Ks, and the parameter WBR. Here, a color shown by the image data Ri, Gi, or Bi of the three colors is referred to as "a color before conversion", and a color shown by the image data Wd, Bd, Gd, or Rd of the four colors is referred to as "colors after conversion". When the two colors are expressed in an HSV color space, brightness V is different between the two colors, the hue H is the same between the two colors, and the saturation S is the same between the two colors. As described above, in image-data conversion processing in the image data conversion unit 10, for each pixel, the hue H holds the same value and the saturation S holds the same value in the HSV color space, between the input image data D1 and the driving image data D2.

The image display device 1 according to the embodiment obtains the distribution ratio WRs and the coefficient Ks based on the saturation S and the parameter WRX and obtains the driving image data D2 with the distribution ratio WRs and the coefficient Ks which have been obtained. Thus, according to the image display device 1, since the preferable parameter WRX depending on the response characteristics and the like of the display unit 20 is set, and the gradation is displayed at a faster response rate, it is possible to improve color reproduction.

In the embodiment, in the distribution ratio-and-coefficient computation unit 13, for each pixel, the first distribution ratio WRs11 is obtained based on the saturation S and the parameter WRX such that driving image data (white image data Wd) corresponding to the common color subframe is in a range from the minimum value Ddmin of driving image data (blue image data Bd, green image data Gd, and red image data Rd) corresponding to other subframes to the maximum value Ddmax thereof. The distribution ratio WRs of the white subframe is determined based on the obtained first distribution ratio WRs1. Thus, it is possible to suppress the change of the luminance of the pixel 26 in one frame period and to improve color reproduction of the image display device. The image data conversion unit 10 can obtain the distribution ratio WRs and the adjustment coefficient Ks by the functions which smoothly change depending on the saturation S (see FIGS. 9 and 10). Thus, it is possible to prevent distortion of an image when a gradation image is displayed.

In the embodiment, the distribution ratio-and-coefficient computation unit 13 obtains the maximum value allowed to be taken by the coefficient Ks, based on the saturation S and the parameter WRX, as the coefficient Ks. The distribution ratio-and-coefficient computation unit obtains the maximum value under a condition in which the distribution ratio WRs is used, and the maximum value Dmax of input image data D1 is set to Maximum Value 1 allowed to be taken by the input image data D1, for each pixel. Thus, it is possible to obtain a large coefficient Ks in an allowable range and to perform amplification and compression on the input image data D1 in an allowable range.

In the embodiment, in the conversion processing by the image data conversion unit 10, the range of the maximum value DDmax of second image data in one frame period is determined in accordance with the minimum value DDmin of the second image data in one frame period (see the expression (1) and FIG. 2). Thus, it is possible to suppress a change of the image data after the conversion, in one frame period, and to improve color reproduction of the image display device.

In the image display device 1 according to the embodiment, the parameter storage unit 11 stores the parameter WBR as a third parameter for designating the luminance of the light source 27 provided in the display unit 20 when the common color subframe (white subframe) is displayed, in addition to the parameter WRX as the first parameter and the parameters RA and RB as the second parameter. The display unit 20 controls the luminance of the light source 27 in accordance with the third parameter, when displaying the common color subframe. Accordingly, according to the embodiment, the preferable parameter WRX is set in accordance with the response characteristics of the display unit 20, and the maximum value DDmax of driving image data D2 in one frame period is limited by using the second parameter, in accordance with the minimum value DDmin of the driving image data D2 in the one frame period (see FIG. 2). Thus, it is possible to more improve color reproduction. In addition, the luminance of the light source 27 when the common color subframe is displayed is controlled with the third parameter (parameter WBR), and thus it is possible to reduce heat generated by the light source 27.

In the embodiment, the image data conversion unit 10 performs the conversion processing on normalized luminance data (input image data D1). Thus, it is possible to accurately perform the conversion processing. The input image data D1 corresponds to the red, green, and blue colors. The driving image data D2 corresponds to red, green, blue, and white subframes. The common color subframe is a white subframe. Thus, in the image display device that displays subframes of three primary colors and the white color based on input image data D1 corresponding to the three primary colors, it is possible to suppress the occurrence of noise at a low-luminance portion of a display image while the gradation properties are held.

<1.8 Other Modification Examples of First Embodiment>

In Step S104, the distribution ratio-and-coefficient computation unit 13 may obtain the first distribution ratio WRs1 and the coefficient Ks by calculation expressions other than the expressions (18a) to (18c) and (21). In Step S201, the distribution ratio-and-coefficient computation unit 13 may obtain the second distribution ratio WRsv2 by another calculation expression satisfying the expression (28). In the above descriptions for the embodiment, the first distribution ratio WRs1 is given by the expression (17) or the expressions (18a) to (18c), and the coefficient Ks is given by the expression (21). However, these are not limited thereto. For example, a configuration (referred to as "a third modification example" below) in which the first distribution ratio WRs1 and the coefficient Ks are given by the following expressions (31) and (32a) may be made. A configuration (referred to as "a fourth modification example" below) in which the first distribution ratio WRs1 and the coefficient Ks are given by the following expressions (31) and (32b) may be made.

$$WRs1=\min(WBRo/(1-S),WRX) \quad (31)$$

$$Ks=1/[1-WRs1(1-S)] \quad (32a)$$

$$Ks=RB/[1-\{WRs1(1-RA)+RA\}(1-S)] \quad (32b)$$

In the expression (31), WBRo is ½.

In the image display device according to the third modification example, the distribution ratio-and-coefficient computation unit obtains the second distribution ratio WRsv2 by the expressions (30a) to (30c), for example. In the expressions (30a) to (30c), WBRb=1 and V=Dmax·Ks are established, and Tsv is given by the following expression (33). WRsv2 is set to WRs1 at time of WRZ≤WRs1.

$$Tsv=3\cdot Ks/[2\{Ks(1-S)(WRZ-WRs1)+1\}] \quad (33)$$

In the image display device according to the third modification example, the distribution ratio-and-coefficient computation unit may obtain the second distribution ratio WRsv2 by another calculation expression satisfying the expression (28) when RA=0 and RB=WBR=1 are set in the expressions (27a) to (27c).

In the image display device according to the fourth modification example, the distribution ratio-and-coefficient computation unit obtains the second distribution ratio WRsv2 by the expressions (30a) to (30c), for example. Tsv is given the expressions (29), and WBRb=RB/(1+RA) and V=Dmax·Ks are established in the expression (29) and the expressions (30a) to (30c). The parameter WRZ takes a value in a range of WRs≤WRZ≤1. In the image display device according to the fourth modification example, the distribution ratio-and-coefficient computation unit may obtain the second distribution ratio WRsv2 by another calculation expression satisfying the expression (28) when WBR=1 is set in the expressions (27a) to (27c).

2. Second Embodiment

<2.1 Overall Configuration>

Figure 14:
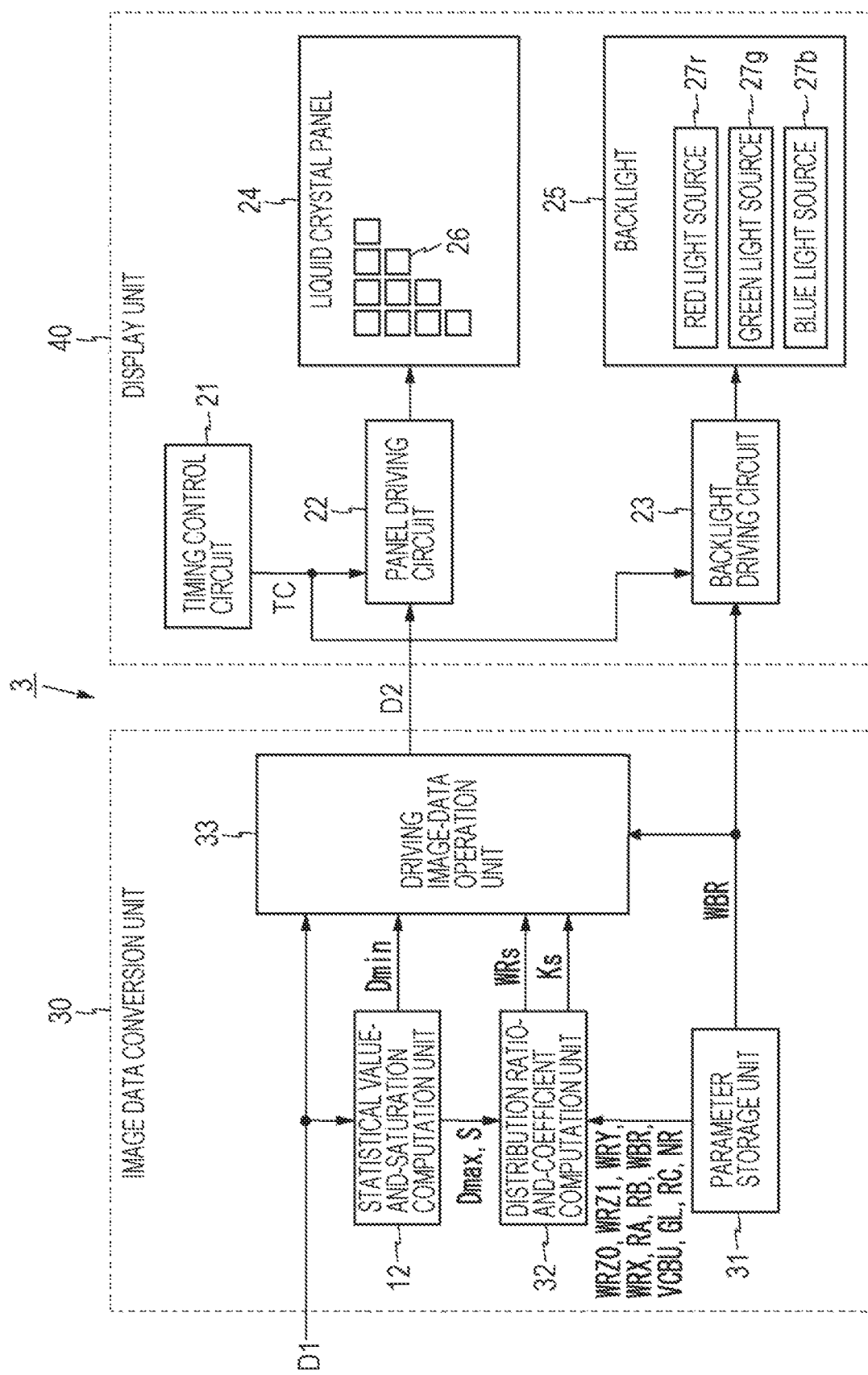
FIG. 14 is a block diagram illustrating a configuration of an image display device according to a second embodiment.

FIG. 14 is a block diagram illustrating a configuration of an image display device according to a second embodiment. An image display device 3 illustrated in FIG. 14 includes an image data conversion unit 30 and a display unit 40. The image data conversion unit 30 is obtained in a manner that, in the image data conversion unit 10 in the first embodiment, the distribution ratio-and-coefficient computation unit 13 is replaced with a distribution ratio-and-coefficient computation unit 32, and the parameter storage unit 11 is replaced with a parameter storage unit 31. Differences from the first embodiment will be described below.

The image display device according to the embodiment selectively performs low-luminance-portion noise handling processing and further selectively performs high-luminance-portion noise handling processing. In the image display device according to the embodiment, the parameter storage unit 31 stores parameters NR, GL, RC, WRY, WRZ0, and WRZ1 in addition to the parameters WRX, RA, RB, and WBR. The distribution ratio-and-coefficient computation unit 32 obtains the coefficient Ks by a calculation expression different from that in the first embodiment, when high-luminance-portion noise handling processing is performed.

The parameter GL indicates the type of high-luminance-portion noise handling processing and takes a value of 0, 1, or 2. The value of 0 indicates that high-luminance-portion noise handling processing is not performed. The value of 1 or 2 indicates that the high-luminance-portion noise handling processing is performed. The parameter RC is provided in a calculation expression of obtaining the coefficient Ks when the high-luminance-portion noise handling processing is performed. The parameter RC takes a value in a range of 0≤RC<1.

Figure 15:
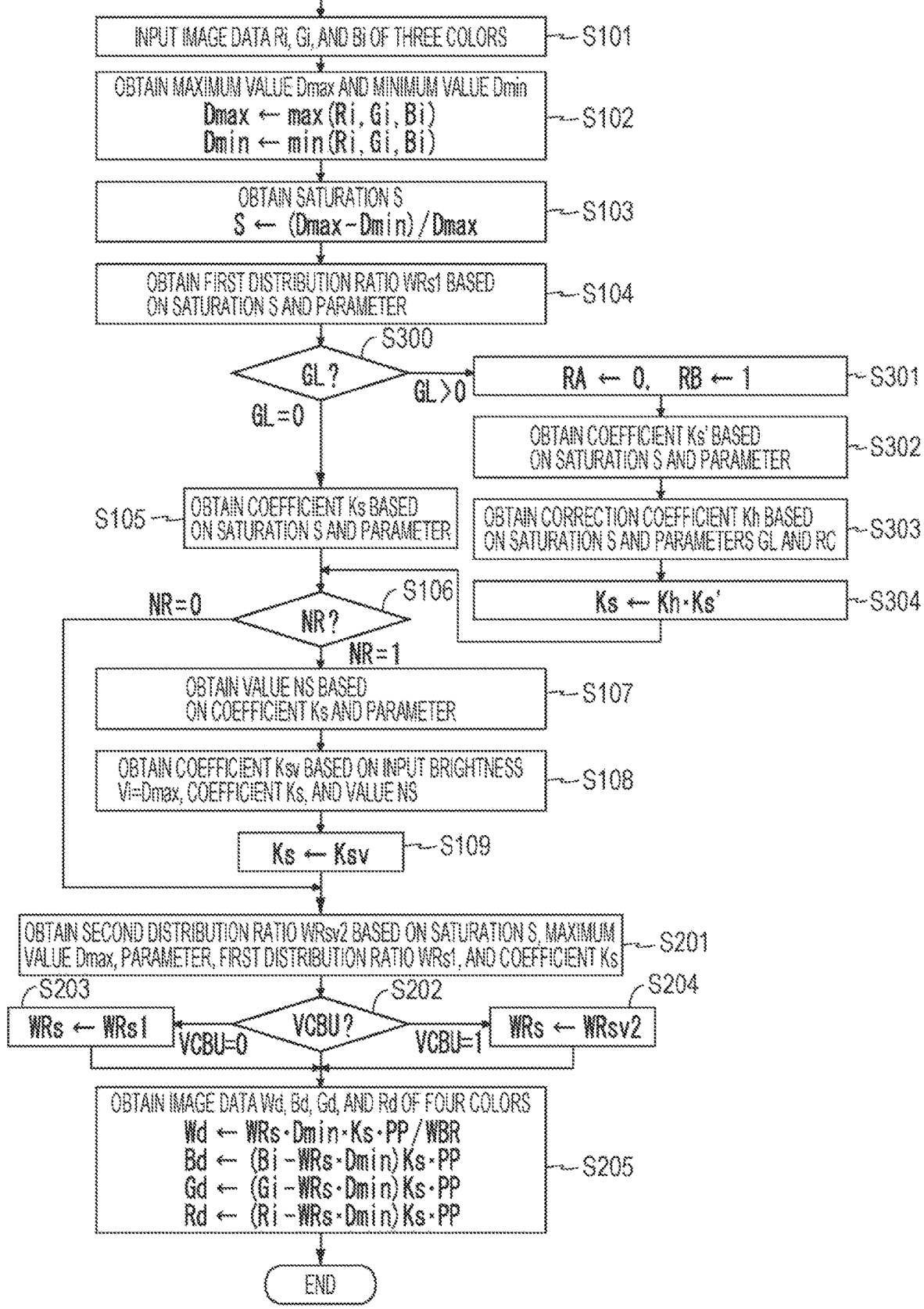
FIG. 15 is a flowchart illustrating image-data conversion processing in the image display device according to the second embodiment.

FIG. 15 is a flowchart illustrating image-data conversion processing according to the embodiment. The flowchart illustrated in FIG. 15 is obtained by adding Steps S300 to S304 and S106 to S109 to the flowchart illustrated in FIG. 3. The image data conversion unit 30 operates similar to the first embodiment, in Steps S101 to S104.

Then, the distribution ratio-and-coefficient computation unit 32 performs condition branching in accordance with the parameter GL (Step S300). The distribution ratio-and-coefficient computation unit 32 causes the process to proceed to Step S105 at time of GL=0, and to proceed to Step S301 at time of GL>0. In the former case, the distribution ratio-and-coefficient computation unit 32 obtains the coefficient Ks by the following expression (40) (Step S105) (see the expression (21)).

$$Ks=RB/[1-\{WRs1(1-RA)+RA\}(1-S)] \quad (40)$$

In the latter case, the distribution ratio-and-coefficient computation unit 32 sets the parameters RA and RB to satisfy RA=0 and RB=1 (Step S301) and obtains a tentative coefficient Ks' by the following expression (41a) (Step S302). Then, the distribution ratio-and-coefficient computation unit 32 obtains a correction coefficient Kh by the following expression (41b) at time of GL=1, and obtains the correction coefficient Kh by the following expression (41c) at time of GL=2 (Step S303). The correction coefficient Kh increases as the saturation S becomes smaller. The distribution ratio-and-coefficient computation unit 32 outputs a result obtained by multiplying the tentative coefficient Ks' by the correction coefficient Kh, as the adjustment coefficient Ks (Step S304).

$$Ks'=1/\{1-WRs1(1-S)\} \quad (41a)$$

$$Kh=1-RC\cdot S \quad (41b)$$

$$Kh=1-RC\cdot S^2 \quad (41c)$$

Then, the distribution ratio-and-coefficient computation unit 32 performs condition branching in accordance with the parameter NR (Step S106). The distribution ratio-and-coefficient computation unit 32 causes the process to proceed to Step S201 at time of NR=0, and to proceed to Step S107 at time of NR=1. In the latter case, the distribution ratio-and-coefficient computation unit 32 obtains a value NS based on the coefficient Ks and the parameter WBR (Step S107), obtains a coefficient Ksv based on the maximum value Dmax indicating the input brightness Vi, the coefficient Ks, and the value NS (Step S108), and sets the coefficient Ksv as the coefficient Ks (Step S109).

Then, the distribution ratio-and-coefficient computation unit 32 obtains the second distribution ratio WRsv2 by a calculation expression (which will be described later) based on the saturation S, the adjusted brightness V, the parameters WRX, WBR, WRZ0, WRZ1, and WRY, the first distribution ratio WRs1, and the coefficient Ks (Step S201).

Then, the distribution ratio-and-coefficient computation unit 32 performs condition branching in accordance with the parameter VCBU (Step S202). Similar to the first embodiment, the parameter VCBU indicates whether or not color-breakup handling processing is performed, and takes a value of 0 or 1. The value of 0 indicates that the color-breakup handling processing is not performed. The value of 1 indicates that the color-breakup handling processing is performed. The distribution ratio-and-coefficient computation unit 32 sets the first distribution ratio WRs1 as the distribution ratio WRs of the white subframe at time of VCBU=0 (Step S203) and sets the second distribution ratio WRsv2 as the distribution ratio WRs of the white subframe at time of VCBU=1 (Step S204).

The driving image-data operation unit 33 obtains image data Wd, Bd, Gd, and Rd of four colors based on the image data Ri, Gi, and Bi of the three colors, the minimum value Dmin, the distribution ratio WRs, the coefficient Ks, and the parameter WBR by the following expressions (42a) to (42d) (Step S205).

$$Wd=WRs\cdot Dmin\cdot Ks\cdot PP/WBR \quad (42a)$$

$$Bd=(Bi-WRs\cdot Dmin)Ks\cdot PP \quad (42b)$$

$$Gd=(Gi-WRs\cdot Dmin)Ks\cdot PP \quad (42c)$$

$$Rd=(Ri-WRs\cdot Dmin)Ks\cdot PP \quad (42d)$$

Here, in the expressions (42a) to (42d), PP indicates a value (=P/Pmax) obtained by dividing the maximum value P for image data constraint by the maximum value Pmax (=1) which may be set for the image data. PP is also used in a gradation compression method in which the saturation S is not considered. In the following descriptions, PP=1 is assumed. In a case of PP≠1, outputting the maximum luminance when S is 0 is not possible.

The driving image-data operation unit 33 obtains image data Wd, Bd, Gd, and Rd of four colors by using the coefficient Ks obtained in Step S105 or S304 when NR is 0, and obtains the image data Wd, Bd, Gd, and Rd of the four colors by using the coefficient Ksv obtained in Step S108 when NR is 1. As described above, the image data conversion unit 30 does not perform low-luminance-portion noise handling processing when NR is 0, and performs low-luminance-portion noise handling processing when NR is 1 (details will be described later).

<2.2 Regarding Adjustment Coefficient Ks>

As illustrated in FIG. 4 and described above, the range of (S, WRs), which is indicated by the saturation S and the distribution ratio WRs is divided into the first area in which Ddmin<Wd<Ddmax is satisfied, the second area in which Ddmax<Wd is satisfied, and the third area in which Wd<Ddmin is satisfied. In a case where the distribution ratio WRs is determined to cause (S, WRs) to be in the first area, the expression of Ddmin<Wd<Ddmax is established, and a difference between image data Wd, Bd, Gd, and Rd of four colors included in the driving image data D2 becomes the minimum ((Ddmax−Ddmin) is established). It is desirable that (S, WRs) is in the first area, so long as color breakup does not occur. Therefore, in the embodiment, in a case of GL>0 (case where high-luminance-portion noise handling processing is performed), the coefficient Ks=1/{1−WRs(1−S)} obtained by substituting RA=0 and RB=1 into the expression (40) is set as the tentative coefficient Ks' (see the expression (41a)), and a result obtained by multiplying the tentative coefficient Ks' by the correction coefficient Kh (expressions (41b) and (41c)) is set as the adjustment coefficient Ks.

Figure 16:
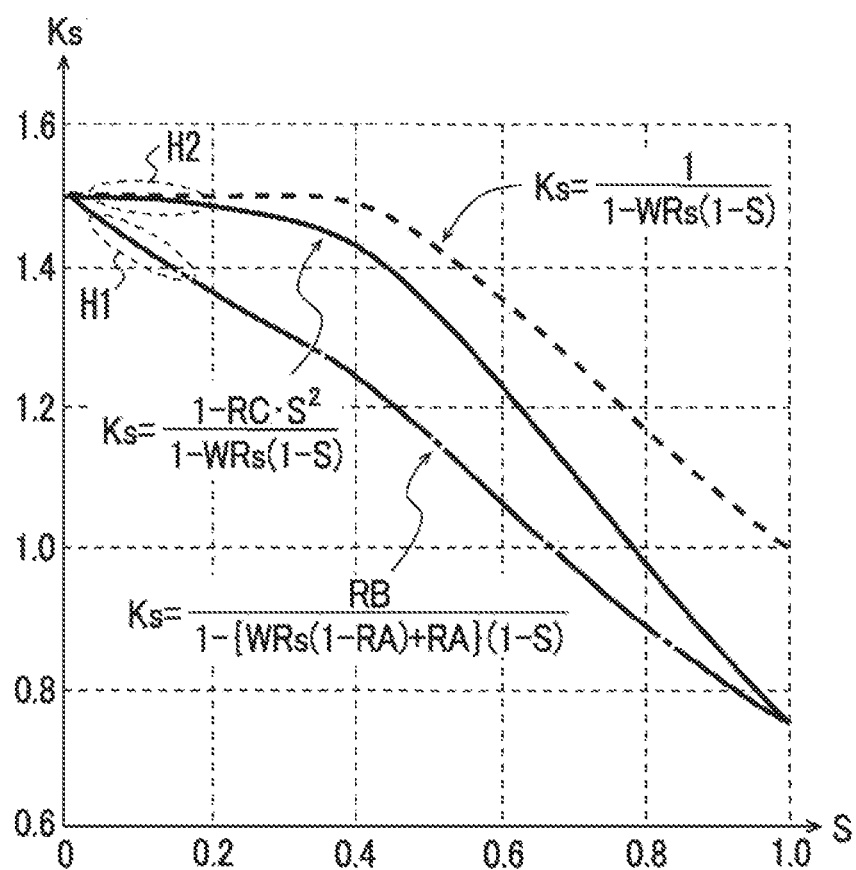
FIG. 16 is a diagram illustrating a graph for an adjustment coefficient Ks in the image display device according to the second embodiment.

FIG. 16 is a diagram illustrating a graph for the adjustment coefficient Ks in the image display device according to the embodiment. The adjustment coefficient Ks in a case of GL=0 is given by the expression (40) including the parameters RA and RB (Step S105) and is indicated by a curved line of a bold one-dot chain line in FIG. 16. The curved line of the bold one-dot chain line indicates the adjustment coefficient Ks when the parameters RA and RB are set to be RA=0.25 and RB=0.75. On the contrary, in a case of GL>0 (here, GL is set to 2), the parameters RA and RB are set to be RA=0 and RB=1 (Step S301). The adjustment coefficient Ks is given by an expression of Ks=Kh·Ks' based on the expressions (41a) and (41c) and is indicated by a curved line of a bold solid line in FIG. 16. That is, the expression (41a) corresponding to the expression of $Ks=1/\{1-WRs(1-S)\}$ obtained by substituting $RA=0$ and $RB=1$ into the expression (40) represents a curved line of a bold broken line in FIG. 16. The expression of $Ks=Kh\cdot Ks'$ representing a curved line of a bold solid line is obtained by multiplying the expression (41a) by the expression (41c), that is, $Kh=1-RC\cdot S2$. The curved line of the bold solid line represents the adjustment coefficient Ks when the parameter RC is set to 0.25. The function $Ks=RB/[1-\{WRs(1-RA)+RA\}(1-S)]$ represented by the expression (40) is referred to as "a first function" below. The function $Ks=Kh\cdot Ks'(1-RC\cdot S2)/\{1-WRs(1-S)\}$ obtained based on the expressions (41a) and (41c) is referred to as "a second function" below.

The distribution ratio-and-coefficient computation unit 32 obtains the coefficient Ks with the first function at time of $GL=0$ (Step S105). The distribution ratio-and-coefficient computation unit obtains the coefficient Ks with the second function at time of $GL=2$ (Steps S302 to S304). The second function is defined by using the function $Ks=1/\{1-WRs(1-S)\}$ as auxiliary. The second function is expressed as $Ks=Kh/\{1-WRs(1-S)\}$ (Kh is a function based on the saturation S) and takes the same value as that in the first function at time of $S=0$. The second function preferably takes the same value RB as that in the first function at time of $S=1$.

In a case where the coefficient Ks is obtained with the first function (case of $GL=0$), when the saturation S is small and the luminance is high, the coefficient Ks largely changes with respect to the change of the saturation S (see an H1 portion in FIG. 16). Therefore, in a case where the coefficient Ks is obtained with the first function, gradation skipping may occur in a display image, and noise may occur at a high-luminance portion included in the display image. On the contrary, in a case where the coefficient Ks is obtained with the second function (case of $GL>0$), the amount of the coefficient Ks changing with respect to the change of the saturation S is small even though the saturation S is small, and the luminance is high (see an H2 portion in FIG. 16). Thus, if the coefficient Ks is obtained with the second function, it is possible to suppress the occurrence of gradation skipping in a display image and to suppress an occurrence of noise at a high-luminance portion included in the display image.

As described above, in the image display device according to the embodiment, at time of $GL>0$, for each pixel, the distribution ratio-and-coefficient computation unit 32 obtains the first distribution ratio WRs1, the tentative coefficient Ks', and the correction coefficient Kh (which becomes smaller as the saturation S increases) based on the saturation S and the parameters WRX, WBR, and RC (expressions (41b) and (41c)). The distribution ratio-and-coefficient computation unit 32 outputs a result obtained by multiplying the tentative coefficient Ks' by the correction coefficient Kh, as the coefficient Ks. Thus, according to the image display device according to the embodiment, it is possible to suppress the occurrence of noise at a high-luminance portion of a display image. A specific method of obtaining the first distribution ratio WRs1 will be described later.

<2.3 Method of Determining Function of Obtaining First Distribution Ratio WRs1>

The distribution ratio-and-coefficient computation unit 32 has a function of obtaining the first distribution ratio WRs1 based on the saturation S and a second function of obtaining the adjustment coefficient Ks based on the saturation S at time of $NR=0$. The functions change depending on the parameters RA, RB, WRX, and WBR stored in the parameter storage unit 31, in a case of $GL=0$. The functions change depending on the parameters WRX, WBR, and RC stored in the parameter storage unit 31, in a case of $GL>0$. Details of the former function, that is, the method of determining the function of obtaining the first distribution ratio WRs1 are similar to those in the first embodiment (see the expressions (17), (18a) to (18c), and the like). Details of the latter function are as described above for the adjustment coefficient Ks. As described above, the function of obtaining the coefficient Ks is represented with the first distribution ratio WRs1 (see the expressions (40) and (41a)). However, since the first distribution ratio WRs1 is obtained based on the saturation S, the function of obtaining the coefficient Ks is a function based on the saturation S. In a first example and a second example described below, the parameter WRX takes a value in a range of $\frac{1}{2} \leq WRX \leq 1$.

<2.4 Case where Low-Luminance-Portion Noise Handling Processing is Performed>

Next, a method of determining the function of obtaining the adjustment coefficient Ks in a case where low-luminance-portion noise handling processing is performed (case of $NR=1$) will be described (see Steps S107 to S109 in FIG. 15).

When NR is 1, the distribution ratio-and-coefficient computation unit 32 obtains the value NS by the following expression (43) in Step S107 and obtains the coefficient Ksv by the following expression (44) in Step S108.

$$NS=NB-NB\{Ks-(1+WBR)\}^2/(1+WBR)^2 \quad (43)$$

$$Ksv=(Ks-NS)Vi+NS \quad (44)$$

NB in the expression (43) is given by the following expression.

$$NB=(1+WBR)^2/\{2(1+WBR)-1\} \quad (45)$$

Vi indicates the input brightness and is given by the following expression.

$$Vi=D\max=\max(Ri,Gi,Bi) \quad (46)$$

If the expression (43) is substituted into the expression (44), a calculation expression (referred to as "Expression E" below) of obtaining the coefficient Ksv based on the input brightness Vi, the coefficient Ks, and the parameter WBR is derived. If Vi is set to 0 in Expression E, the function of obtaining the coefficient Ksv when Vi is 0 is obtained. Similarly, if Vi is set to 1 in Expression E, the function of obtaining the coefficient Ksv when V is 1 is obtained. If Vi is set to Vx (here, $0<Vx<1$) in Expression E, the function of obtaining the coefficient Ksv when Vi is Vx is derived. The coefficient Ksv at time of $Vi=0$ is equal to the value NS (Ksv=NS), and the coefficient Ksv at time of $Vi=1$ is equal to the coefficient Ks (Ksv=Ks). The coefficient Ksv at time of $Vi=Vx$ has a value obtained by dividing the coefficient Ks and the value NS at a ratio of $(1-Vx):Vx$.

Figure 17:
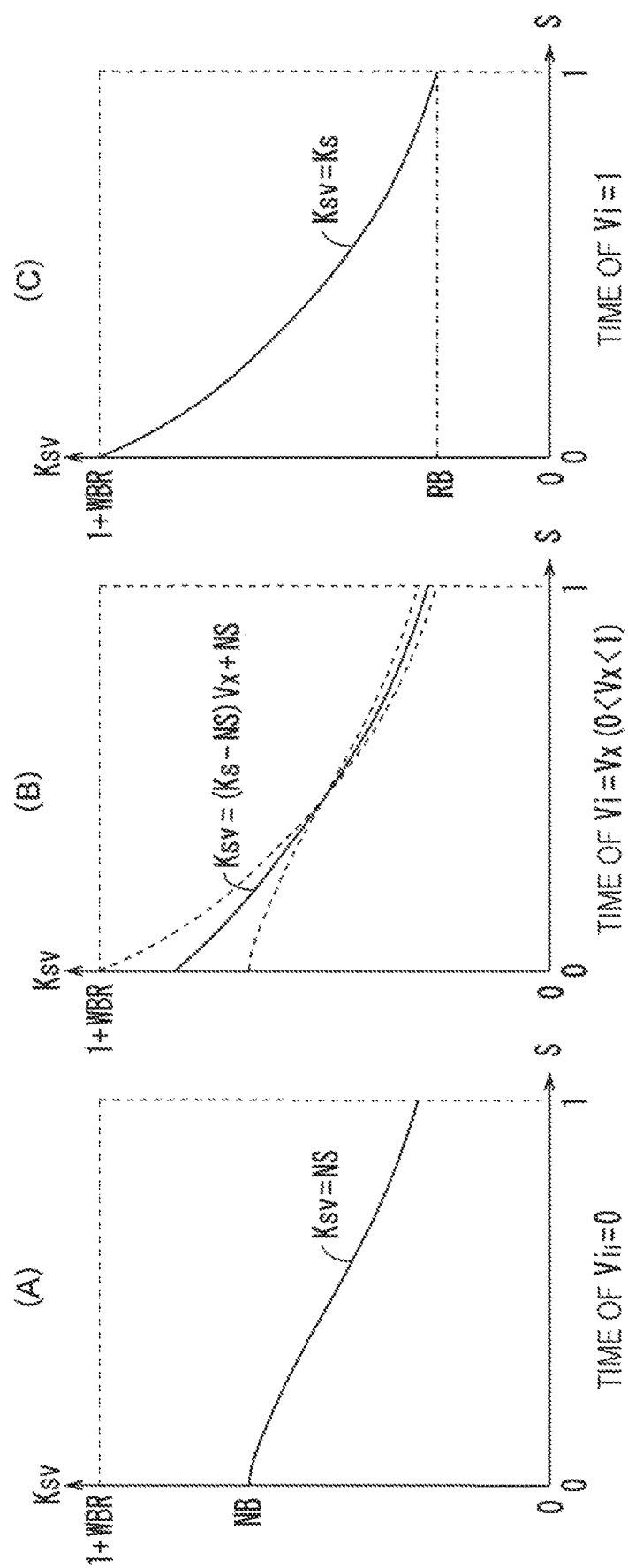
FIGS. 17(A) to 17(C) are diagrams illustrating graphs of a coefficient Ksv in a case where low-luminance-portion noise handling processing is performed in the second embodiment.

FIG. 17 is a diagram illustrating a graph of the coefficient Ksv. FIGS. 17(A) to 17(C) illustrate graphs at time of $Vi=0$, $Vi=Vx$, and $Vi=1$, respectively. As illustrated in FIG. 17, when the brightness Vi is set to a certain value, the coefficient Ksv decreases as the saturation S becomes greater, regardless of the value of the brightness Vi. Therefore, the coefficient Ksv becomes the maximum at time of $S=0$, and becomes the minimum at time of $S=1$. The difference between the minimum value and the maximum value of the coefficient Ksv at time of $Vi=0$ is smaller than the difference between the minimum value and the maximum value of the coefficient Ksv at time of $Vi=1$. The difference between the minimum value and the maximum value of the coefficient Ksv decrease as the brightness Vi becomes smaller.

As described above, since the difference between the minimum value and the maximum value of the coefficient Ksv decreases as the brightness Vi becomes smaller, the amount of the coefficient Ksv changing with respect to the amount of the saturation S changing is small when the brightness Vi is small. Thus, if low-luminance-portion noise handling processing is performed, it is possible to suppress an occurrence of a situation in which the color of a pixel largely changes between the pixel and the adjacent pixel when the luminance is low, and to suppress the occurrence of noise at a low-luminance portion of a display image.

In the image display device 3, if the saturation S and the hue H are the same, it is necessary that the luminance of a pixel 26 increases as the input image data D1 becomes greater (that is, gradation properties are held). In order to hold the gradation properties, if the saturation S is the same, it is necessary that a result obtained by performing amplification and compression processing on the brightness V increases as the brightness Vi of the input image data D1 becomes greater. Thus, at least, it is necessary that a result obtained by multiplying the brightness Vi by the coefficient Ksv at time of 0<Vi<1 is smaller than a result obtained by multiplying the brightness Vi (=1) by the coefficient Ksv (=Ks) at time of Vi=1. With Ksv·Vi≤Ks, the following expression (47) is obtained.

$$Ksv \leq Ks/Vi \quad (47)$$

Figure 18:
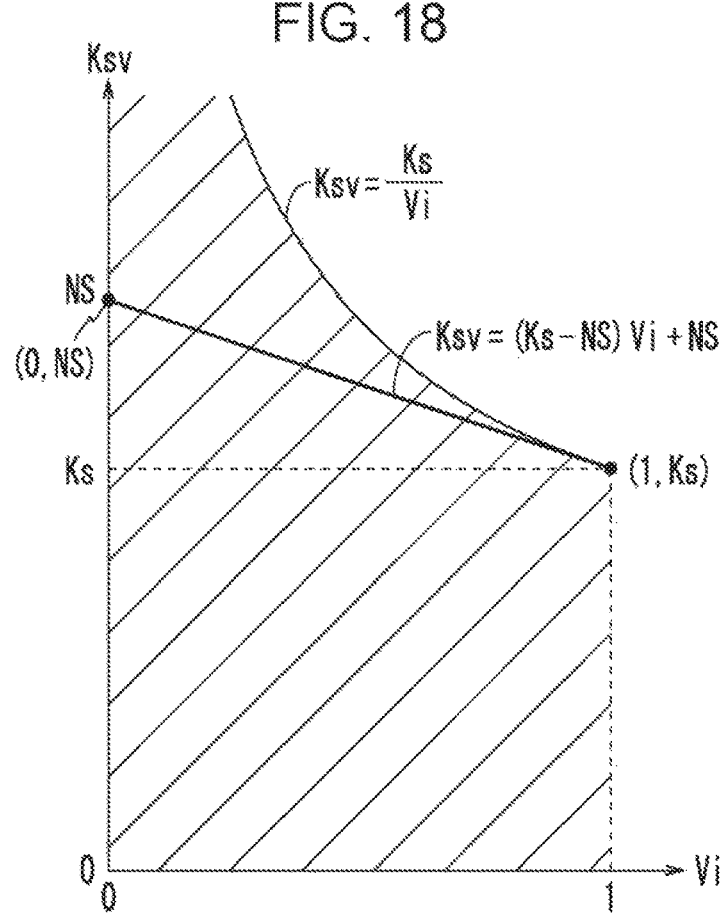
FIG. 18 is a diagram illustrating a range allowed to be taken by the coefficient Ksv in a case where the low-luminance-portion noise handling processing is performed in the second embodiment.

A range satisfying the expression (47) corresponds to a shaded area illustrated in FIG. 18. The function of obtaining the coefficient Ksv based on the brightness Vi is determined such that the graph of the function is in the shaded area illustrated in FIG. 18. As described above, the distribution ratio-and-coefficient computation unit 32 obtains the coefficient Ksv by the expression (44). As illustrated in FIG. 18, the graph of the coefficient Ksv passes through two points (0, NS) and (1, Ks).

Figure 19:
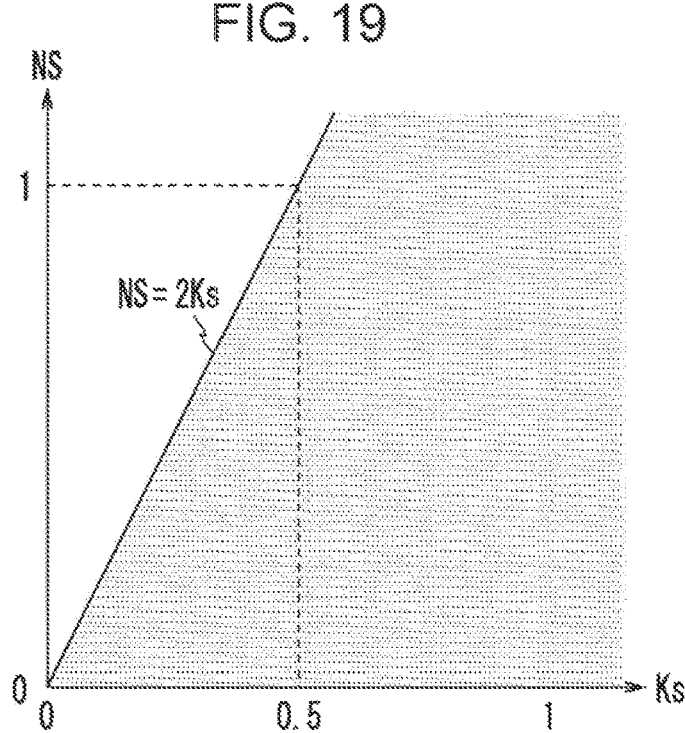
FIG. 19 is a diagram illustrating a range allowed to be taken by a value NS in a case where the low-luminance-portion noise handling processing is performed in the second embodiment.

In order to cause an in equation obtained by substituting the expression (44) with the expression (47) to be established in a range of 0<Vi<1, the slope of a straight line shown by the expression (44) may be equal to or greater than the slope of a tangent line at a point (1, Ks) of the function of Ksv=Ks/Vi. Thus, with Ks−NS≥−Ks, the following expression (48) is derived. A range satisfying the expression (48) corresponds to a dot pattern area illustrated in FIG. 19.

$$NS \leq 2Ks \quad (48)$$

Figure 20:
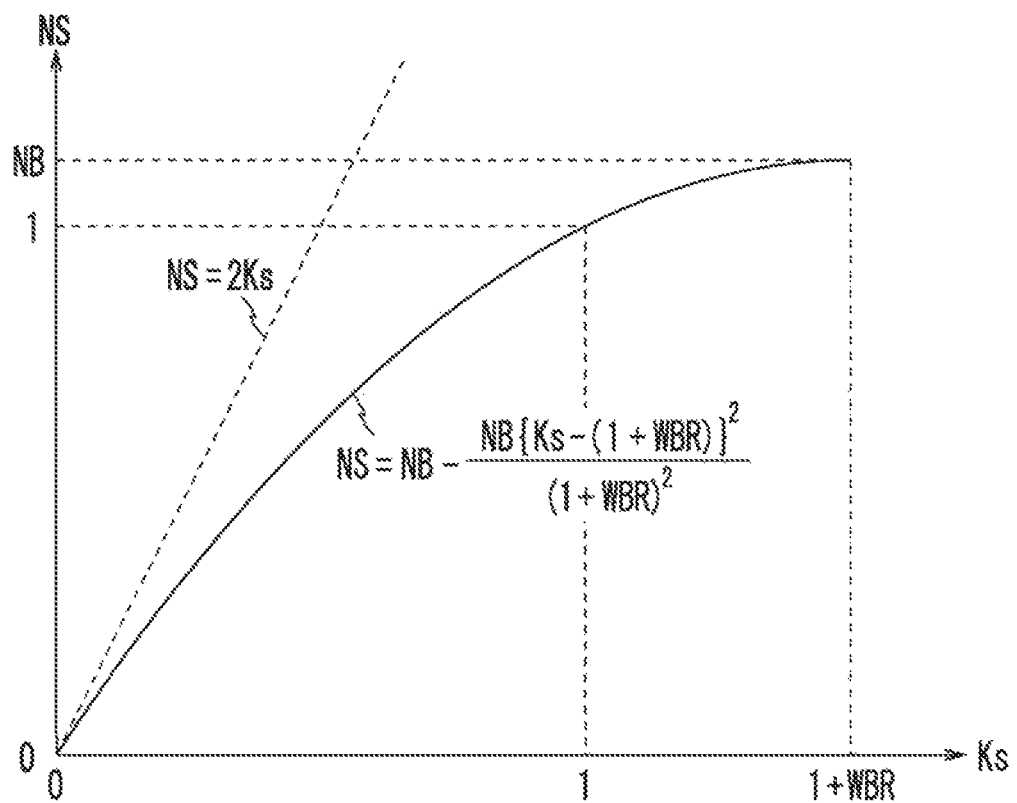
FIG. 20 is a diagram illustrating a graph of the value NS set in a case where the low-luminance-portion noise handling processing is performed in the second embodiment.

FIG. 20 is a diagram illustrating a graph of the value NS. The graph illustrated in FIG. 20 passes through three points (0, 0), (1, 1), and (1+WBR, NB). The slope of a tangent line at a point (0, 0) of the function of obtaining the value NS satisfies the expression of 2NB/(1+WBR)=(2+2WBR)/(1+2WBR), and is equal to or smaller than 2 in a range of 0≤WBR≤1. Thus, the graph illustrated in FIG. 20 is in the range illustrated in FIG. 19. Accordingly, since the value NS is obtained by the expression (44), if the saturation S and the hue H are the same, the result obtained by performing amplification and compression processing on the brightness Vi increases as the brightness Vi of the input image data D1 becomes greater. Thus, in a case where low-luminance-portion noise handling processing is performed, the luminance of a pixel 26 increases as the input image data D1 becomes greater, and thus it is possible to hold the gradation properties.

Figure 21:
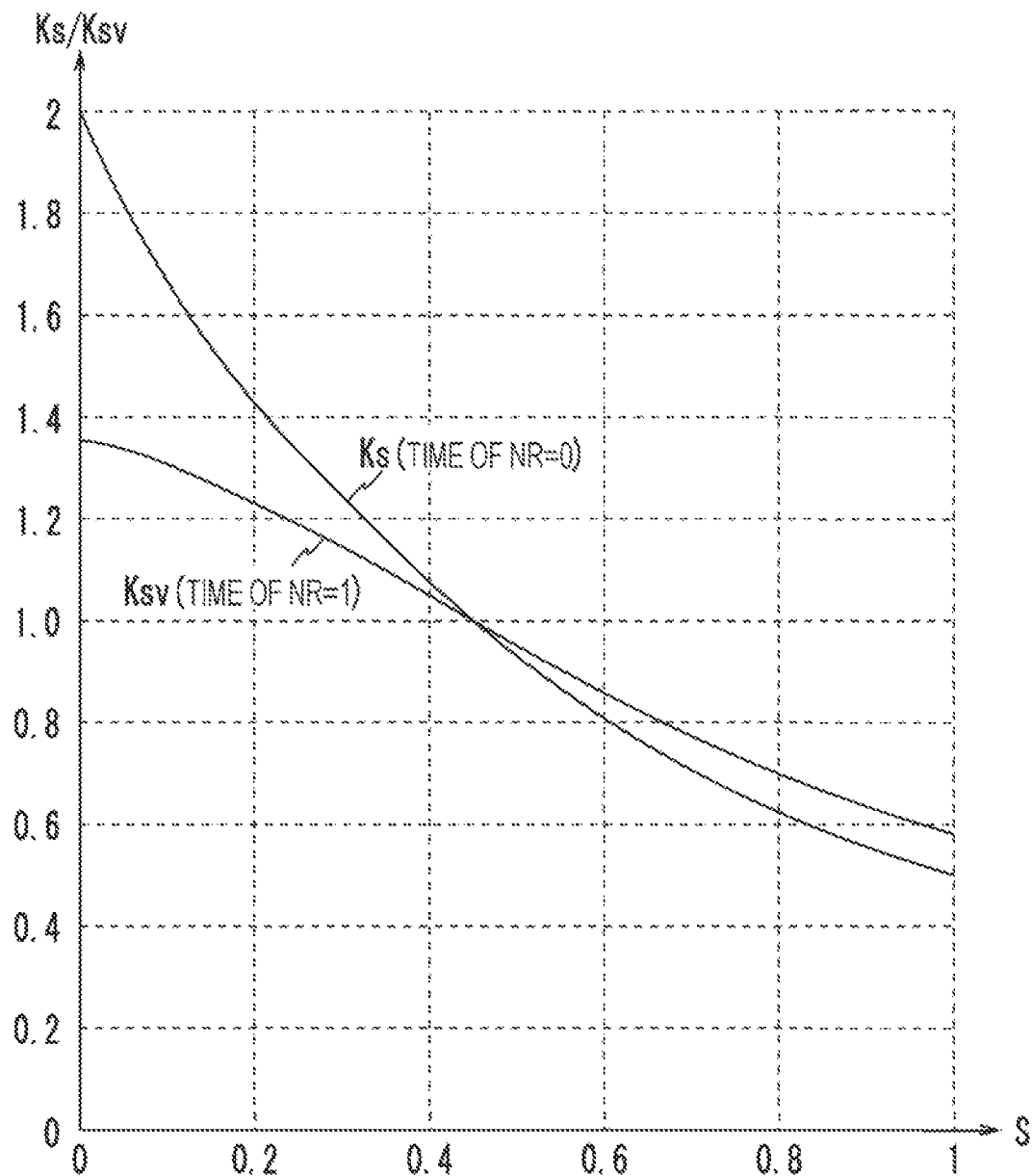
FIG. 21 is a diagram illustrating graphs of the coefficients Ksv and Ks, which are used for describing effects of the low-luminance-portion noise handling processing in the second embodiment.

The effects of low-luminance-portion noise handling processing will be described with reference to FIGS. 21 to 23. FIG. 21 is a diagram illustrating a graph of the coefficient in the image display device 3. FIG. 21 illustrates the graph of the coefficient Ks obtained in Step S105 at time of NR=0 and the graph of the coefficient Ksv obtained in Step S108 at time of NR=1. Here, WRX=WBR=1 and RA=RB=0.5 are set. FIG. 22 is a diagram illustrating an example of image-data conversion processing in a case where low-luminance-portion noise handling processing is not performed (at time of NR=0), in the image display device 3. FIG. 23 is a diagram illustrating an example of image-data conversion processing in a case where the low-luminance-portion noise handling processing is performed (at time of NR=1), in the image display device 3.

Here, as an example, a case where red image data, green image data, and blue image data which are included in input image data D1 corresponds to (0.25, 0.25, 0.25) and a case where the red image data, green image data, and blue image data corresponds to (0.25, 0.25, 0.2) are considered (the former is referred to as "data Da" below, and the latter is referred to as "data Db" below). Regarding data Da, S is 0, and Vi is 0.25. Regarding data Db, S is 0.2, and Vi is 0.25.

When NR is 0, and S is 0, Ks is 2. When NR is 0, and S is 0.2, Ks is 1.428 (see FIG. 21). Thus, in a case where low-luminance-portion noise handling processing is not performed (FIG. 22), amplification and compression processing of multiplying the data Da by Ks=2 is performed, and image data after the amplification and compression processing corresponds to (0.5, 0.5, 0.5). Amplification and compression processing of multiplying the data Db by Ks=1.428 is performed, and image data after the amplification and compression processing corresponds to (0.357, 0.357, 0.286). A difference between the data Da and the data Db is small. However, in a case where the low-luminance-portion noise handling processing is not performed, a large difference occurs between a result obtained by performing amplification and compression processing on the data Da and a result obtained by performing amplification and compression processing on the data Db.

When NR is 1, and S is 0, Ks is 1.333. When NR is 1, and S is 0.2, Ks is 1.224 (see FIG. 21). Thus, in a case where low-luminance-portion noise handling processing is performed (FIG. 23), amplification and compression processing of multiplying the data Da by Ks=1.333 is performed, and image data after the amplification and compression processing corresponds to (0.333, 0.333, 0.333). Amplification and compression processing of multiplying the data Db by Ks=1.224 is performed, and image data after the amplification and compression processing corresponds to (0.306, 0.306, 0.245). In a case where the low-luminance-portion noise handling processing is performed, the difference between the result obtained by performing amplification and compression processing on the data Da and the result obtained by performing amplification and compression processing on the data Db is smaller than that in a case where the low-luminance-portion noise handling processing is not performed.

It is assumed that a pixel driven based on the data Da is adjacent to a pixel driven based on the data Db. In a case where the low-luminance-portion noise handling processing is not performed, the difference of the color between the two pixels is large, and thus noise occurs at a low-luminance portion of a display image. Since the low-luminance-portion noise handling processing is performed, the difference of the color between the two pixels is reduced, and thus it is possible to suppress the occurrence of noise at the low-luminance portion of the display image.

<2.5 Method of Determining Function of Obtaining Second Distribution Ratio WRsv2>

As described above, in a case of VCBU=0, that is, a case where color-breakup handling processing is not performed, the first distribution ratio WRs1 is set as the distribution ratio WRs of the white subframe. In a case of VCBU=1, that is, a case where the color-breakup handling processing is performed, the second distribution ratio WRsv2 is set as the distribution ratio WRs of the white subframe (Steps S202 to S204). The function of obtaining the first distribution ratio WRs11 is determined in the above-described manner. A method of determining the function of obtaining the second distribution ratio WRsv2 will be described below. In a case of GL=0 (case where high-luminance-portion noise handling processing is not performed), the method of determining the function of obtaining the second distribution ratio WRSv2 is similar to that in the first embodiment (see the expressions (27a) to (30c) and FIG. 11). The method of determining the function of obtaining the second distribution ratio WRSv2 in a case of GL>0 (case where high-luminance-portion noise handling processing is performed) will be described later.

The embodiment is different from the first embodiment in that, in a case of GL>0, RA=0 and RB=1 in the expression (1) are set, and the minimum value DDmin and the maximum value DDmax of driving image data D2 in one frame period are not directly limited by the values of the parameters RA and RB. The minimum value Rsva of the second distribution ratio WRsv2 in a case where (S, WRs1) is in the first area, the maximum value Rsvb of the second distribution ratio WRsv2 in a case where (S, WRs1) is in the second area, and the minimum value Rsvc of the second distribution ratio WRsv2 in a case where (S, WRs1) is in the third area are given by substituting RA=0 and RB=1 into the expressions (27a) to (27c), as in the following expression (Ea) to (Ec) (see FIGS. 4 and 11).

$$WRsva=(V-1)/\{V(1-S)\} \tag{Ea}$$

$$WRsvb=WBR/\{V(1-S)\} \tag{Eb}$$

$$WRsvc=(V-1)/\{V(1-S)\} \tag{Ec}$$

Figure 24:
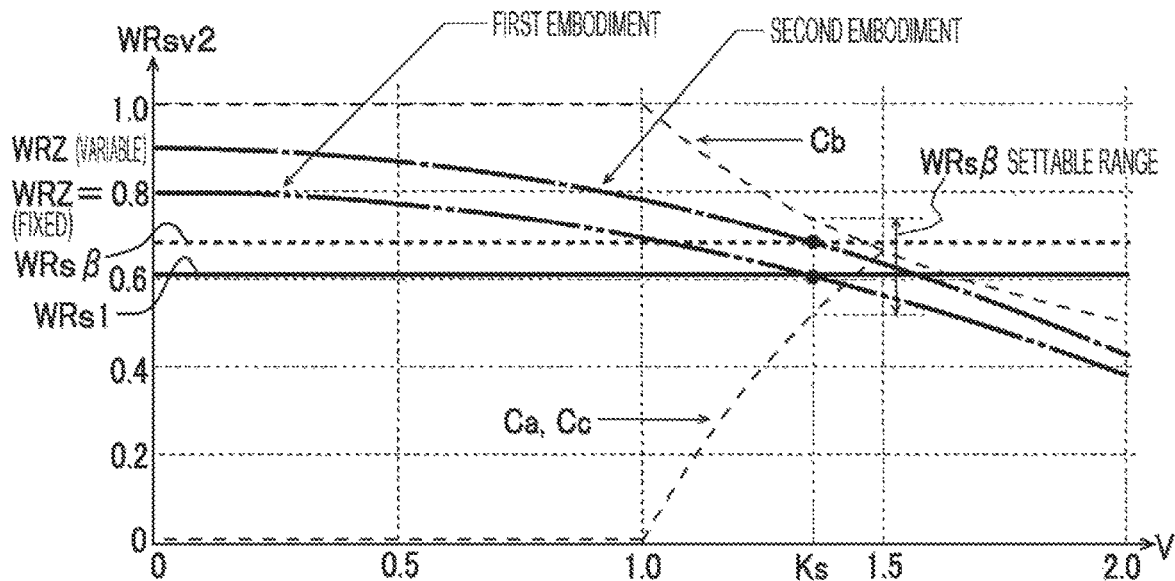
FIG. 24 is a diagram illustrating a method of determining a function of obtaining a second distribution ratio WRsv2 in the image display device according to the second embodiment.

FIG. 24 is a diagram illustrating a method of determining a function of obtaining WRsv2. A curved line illustrated by a one-dot chain line in FIG. 24 indicates the second distribution ratio WRsv2 at time of S=0.5 in the embodiment. Here, RA=0, RB=1, RC=0.25, WBR=0.5, WRX=0.75, WRY=0.85, WRZ0=0.6, and WRZ1=1 are set. The distribution ratio-and-coefficient computation unit 32 obtains the first distribution ratio WRs1 and the coefficient Ks by the calculation expressions (expressions (18a) to (18c) and (21)) according to the second modification example of the first embodiment. In FIG. 24, a portion surrounded by a curved line of a broken line, which is indicated by Ca, Cc, a curved line of a broken line, which is indicated by Cb, a straight line of WRsv2=1, a straight line of WRsv2=0, and a straight line of V=0 corresponds to a range of (V, WRsv2) represented by the adjusted brightness (brightness after amplification and compression processing) V and the second distribution ratio WRsv2 satisfying the expression (28) (this range is referred to as "a distribution-ratio allowable range" below). The function of obtaining the second distribution ratio WRsv2 is determined such that a curved line indicating the function is in the distribution-ratio allowable range.

In the first embodiment, a function indicated by a curved line passing through a point (Ks, WRs1) in a V-WRsv2 plane (plane defined by a V axis and a WRsv2 axis perpendicular to each other) is defined as the function of obtaining the second distribution ratio WRsv2 (see FIG. 11 and the expressions (30a) to (30c)). However, the curved line indicating the second distribution ratio WRsv2 may be in the above-described distribution-ratio allowable range in FIG. 24. In the embodiment, a function indicated by a curved line passing through a point (Ks, WRs3) is defined as the function of obtaining the second distribution ratio WRsv2.

Figure 25:
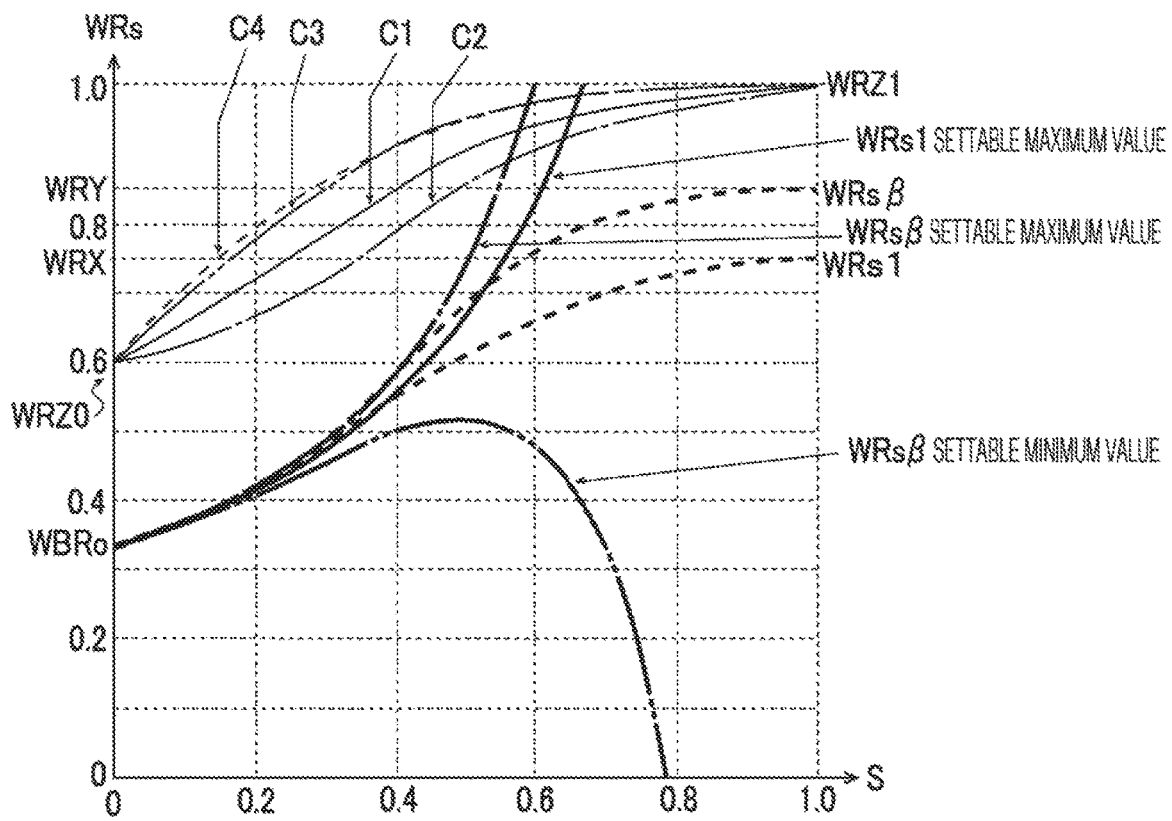
FIG. 25 is a diagram illustrating a graph illustrating a first distribution ratio and a parameter WRZ for describing the method of determining the function of obtaining the second distribution ratio WRsv2 in the image display device according to the second embodiment.

Here, WRsβ is defined as WRs1 when WBRo=WBR/Ks and WRX=WRY are set in the expressions (18a) to (18c). As illustrated in FIG. 25, WRsβ defined as described above is a smooth function of the saturation S, which does not have an inflection point in a settable range (function which smoothly changes with respect to the change of the saturation S). In FIG. 24, an intersection point between the straight line of V=Ks and the curved line Cb corresponds to the settable maximum value of WRsβ, and an intersection point between the straight line of V=Ks and the curved line Ca, Cc corresponds to the settable minimum value of WRsβ. In FIG. 25, a curved line of a one-dot chain line and a curved line of a two-dot chain line indicate functions of the saturation S, which represent the settable maximum value and the settable minimum value of WRsβ, respectively.

WRX≤WRY≤1 is desirable, and the occurrence of color breakup can be suppressed by satisfying this inequality. If WRX and WRY are adjusted, it is possible to set a gradation (driving WBGR pixel data values) in each subframe as a respondable range of the display device (liquid crystal panel 24), and to suppress an occurrence of breakdown of an image.

In the first embodiment, WRZ is set to a fixed value. However, WRZ is desirably set to be allowed to be adjusted in accordance with a response range of the display device (liquid crystal panel 24). In the embodiment, if it is considered that WRsβ is set as the first distribution ratio WRs1, and the expressions (29) and (30a) to (30c) of giving the second distribution ratio WRsv2 are considered, the function of obtaining WRZ may be set in a range of WRsβ≤WRZ≤1 in order to set WRsv2 to increase as the adjusted brightness V becomes smaller.

For example, WRZ can be defined by the following expression with the parameters WRZ0 and WRZ1.

$$WRZ=WRsβ+(1-WRsβ)WRZs \tag{En}$$

WRZs in the expression (En) is defined by any of the following expressions (EE1) to (EE3).

$$WRZs=(WRZa-WRZb)S+WRZb \tag{EE1}$$

$$WRZs=(WRZa-WRZb)S^2+WRZb \tag{EE2}$$

$$WRZs=(WRZb-WRZa)(1-S)^2+WRZa \tag{EE3}$$

In the expressions (EE1) to (EE3), WRZa and WRZb are defined by the following expressions.

$$WRZa=(WRZ1-WRY)/(1-WRY) \tag{50a}$$

$$WRZb=(WRZ0-WBR/Ks)/(1-WBR/Ks) \tag{50b}$$

$$WRY≤WRZ1 \tag{50c}$$

$$WBRo≤WRZ0 \tag{50d}$$

WRZ defined by the following expression may be used instead of WRZ defined by the expression (En) and the expression (EEi) (i=1, 2, 3).

$$WRZ=WRZ1-(WRZ1-WRZ0)(1-S)^3 \tag{E4}$$

In FIG. 25, a curved line indicated by Ci represents a graph of WRs=WRZ in a case where WRZ is defined by the expression (En) and the expression (EEi) (i=1, 2, 3). A curved line indicated by C4 represents a graph of WRs=WRZ in a case where WRZ is defined by the expression (E4). A function of obtaining WRZ is not limited to a function defined by the expression (En) and the expression (EEi) (i=1, 2, 3) or a function defined by the expression (E4). Any function may be provided as the function of obtaining WRZ so long as the function is properly set in a range of WRsβ≤WRZ≤1 with respect to the response characteristics of the display device (liquid crystal panel 24).

In the embodiment, the function of obtaining the second distribution ratio WRsv2 is defined by the function obtained by substituting WRs1=WRsβ, RA=0, and RB=1 into the expressions (29) and (30a) to (30c) on the assumption that WRZ is defined with the parameters WRZ0, WRZ1, and WRY as described above.

Since the function of obtaining the second distribution ratio WRsv2 is defined in this manner, it is possible to set a gradation in each subframe in a respondable range of the display device. The second distribution ratio WRsv2 can be adjusted to a very large value in a settable range without providing an inflection point. Thus, it is possible to reduce the occurrence of color breakup more.

<2.6 Effects of Second Embodiment>

As described above, in the image display device according to the embodiment, at time of VCBU=1, the distribution ratio-and-coefficient computation unit 32 obtains the tentative distribution ratio (first distribution ratio WRs1) and the coefficient Ks based on the saturation S and the parameters WRX and WBR and obtains the distribution ratio WRs (second distribution ratio WRsv2) increasing as the adjusted brightness V becomes smaller, based on the adjusted brightness V (brightness after amplification and compression processing) (obtained by multiplying the maximum value Dmax of the input image data D1 by the coefficient Ks), the parameters WBR and WRZ, the tentative distribution ratio, and the coefficient Ks, for each pixel. In a case of GL>0, the second distribution ratio WRsv2 is defined by the expression obtained by substituting WRs1=WRsβ, RA=0, and RB=1 into the expressions (18a) to (18c) representing the second distribution ratio WRsv2 in the first embodiment. The parameter WRZ does not have a fixed value and is appropriately set with the parameters WRZ0 and WRZ1 in a range of WRsβ≤WRZ≤1. Therefore, the second distribution ratio WRsv2 can be adjusted so as to be very large in the settable range while the characteristics in which the second distribution ratio WRsv2 increases as the adjusted brightness V becomes smaller are provided (see FIGS. 24 and 25). Thus, it is possible to suppress the occurrence of color breakup more while image display having high color reproduction is performed (see FIGS. 12 and 13), in comparison to the technology in the related art.

In the embodiment, in Step S205, the driving image-data operation unit 33 also obtains image data Wd, Bd, Gd, and Rd of the four colors by the expressions (42a) to (42d), based on the image data Ri, Gi, and Bi of the three colors, the minimum value Dmin, the distribution ratio WRs, the adjustment coefficient Ks, and the parameter WBR. Here, when colors (colors before conversion) represented by image data Ri, Gi, and Bi of the three colors and colors (colors after conversion) represented by image data Wd, Bd, Gd, and Rd of the four colors are expressed in an HSV color space, the brightness V differs between two colors, but the hue H and the saturation S have the same values. As described above, in image-data conversion processing in the image data conversion unit 30, for each pixel, the hue H holds the same value and the saturation S holds the same value in the HSV color space, between the input image data D1 and the driving image data D2.

The image display device 3 according to the embodiment obtains the distribution ratio WRs and the coefficient Ks based on the saturation S and the parameter WRX and obtains the driving image data D2 with the distribution ratio WRs and the coefficient Ks which have been obtained. Thus, according to the image display device 3, since the preferable parameter WRX depending on the response characteristics and the like of the display unit 40 is set, and the gradation is displayed at a faster response rate, it is possible to improve color reproduction.

In the embodiment, in the distribution ratio-and-coefficient computation unit 32, for each pixel, the first distribution ratio WRs1 is obtained based on the saturation S and the parameter WRX such that driving image data (white image data Wd) corresponding to the common color subframe is in a range from the minimum value Ddmin of driving image data (blue image data Bd, green image data Gd, and red image data Rd) corresponding to other subframes to the maximum value Ddmax thereof. The distribution ratio WRs of the white subframe is determined based on the obtained first distribution ratio WRs1. Thus, it is possible to suppress the change of the luminance of the pixel 26 in one frame period and to improve color reproduction of the image display device. The image data conversion unit 30 obtains the distribution ratio WRs and the adjustment coefficient Ks by the functions which smoothly changes depending on the saturation S (see FIGS. 16, 24, and the like). Thus, it is possible to prevent distortion of an image when a gradation image is displayed.

In the embodiment, the distribution ratio-and-coefficient computation unit 32 obtains the maximum value allowed to be taken by the coefficient Ks, based on the saturation S and the parameter WRX, as the coefficient Ks. The distribution ratio-and-coefficient computation unit obtains the maximum value under a condition in which the distribution ratio WRs is used, and the maximum value Dmax of input image data D1 is set to Maximum Value 1 allowed to be taken by the input image data D1, for each pixel. Thus, it is possible to obtain a large coefficient Ks in an allowable range and to perform amplification and compression on the input image data D1 in an allowable range.

In the image display device 3 according to the embodiment, the parameter storage unit 31 stores the parameter WBR for designating the luminance of the light source 27 provided in the display unit 40 when the common color subframe (white subframe) is displayed, in addition to the parameter WRX. The display unit 40 controls the luminance of the light source 27 in accordance with the parameter WBR, when displaying a common color subframe. Thus, according to the embodiment, since the preferable parameter WRX depending on the response characteristics of the display unit 40 is set, it is possible to improve color reproduction, and to reduce heat generated by the light source 27 by controlling the luminance of the light source 27 of when a common color subframe is displayed, with the parameter WBR.

3. Third Embodiment

Figure 26:
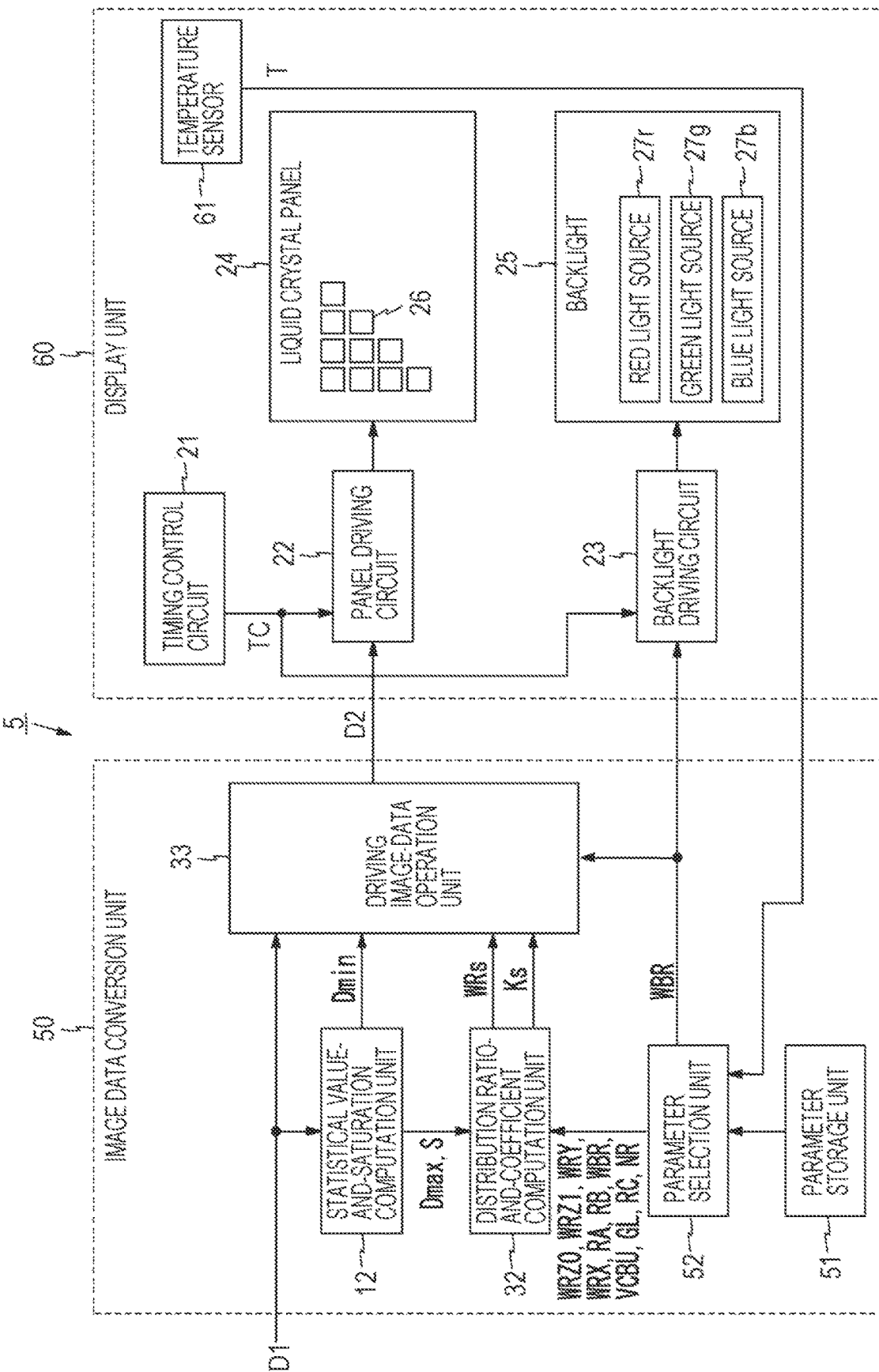
FIG. 26 is a block diagram illustrating a configuration of an image display device according to a third embodiment.

FIG. 26 is a block diagram illustrating a configuration of an image display device according to a third embodiment. An image display device 5 illustrated in FIG. 26 includes an image data conversion unit 50 and a display unit 60. The image data conversion unit 50 is obtained by adding a parameter selection unit 52 to the image data conversion unit 30 according to the second embodiment and replacing the parameter storage unit 31 with a parameter storage unit 51. The display unit 60 is obtained by adding a temperature sensor 61 to the display unit 40 according to the second embodiment. Differences from the first embodiment will be described below.

The temperature sensor 61 is provided in the display unit 60 and measures the temperature T of the display unit 60. The temperature sensor 61 is provided, for example, in the vicinity of the liquid crystal panel 24. The temperature T measured by the temperature sensor 61 is input to the parameter selection unit 52.

The parameter storage unit 51 stores a plurality of values for the parameters WRX, RA, RB, WBR, and RC, in accordance with the temperature. The parameter selection unit 52 selects values from the plurality of values stored in the parameter storage unit 51, in accordance with the temperature T measured by the temperature sensor 61. Then, the parameter selection unit outputs the selected values as the parameters WRX, RA, RB, WBR, and RC. The parameters WRX, RA, RB, WBR, and RC output from the parameter selection unit 52 are input to the distribution ratio-and-coefficient computation unit 32. The parameter WBR is also input to the backlight driving circuit 23. The parameters VCBU, GL, and NR pass through the parameter selection unit 52 from the parameter storage unit 51 and then are input to the distribution ratio-and-coefficient computation unit 32.

As described above, in the image display device 5 according to the embodiment, the image data conversion unit 50 includes the parameter storage unit 51 that stores the parameters WRX, RA, RB, WBR, WRZ0, WRZ1, WRY, GL, RC, and NR used in conversion processing (image-data conversion processing). The display unit 60 includes the temperature sensor 61. The parameter storage unit 51 stores the plurality of values for the parameters WRZ0, WRZ1, WRY, WRX, RA, RB, WBR, and RC in accordance with the temperature. The image data conversion unit 50 selects values depending on the temperature T measured by the temperature sensor 61, among the plurality of values stored in the parameter storage unit 51. The selected values are used in the conversion processing. Thus, according to the image display device 5, the conversion processing is performed based on the parameters WRZ0, WRZ1, WRY, WRX, RA, RB, WBR, and RC in accordance with the temperature T of the display unit 60. Accordingly, it is possible to improve color reproduction even in a case where the response characteristics of the display unit 60 change depending on the temperature.

4. Fourth Embodiment

Figure 27:
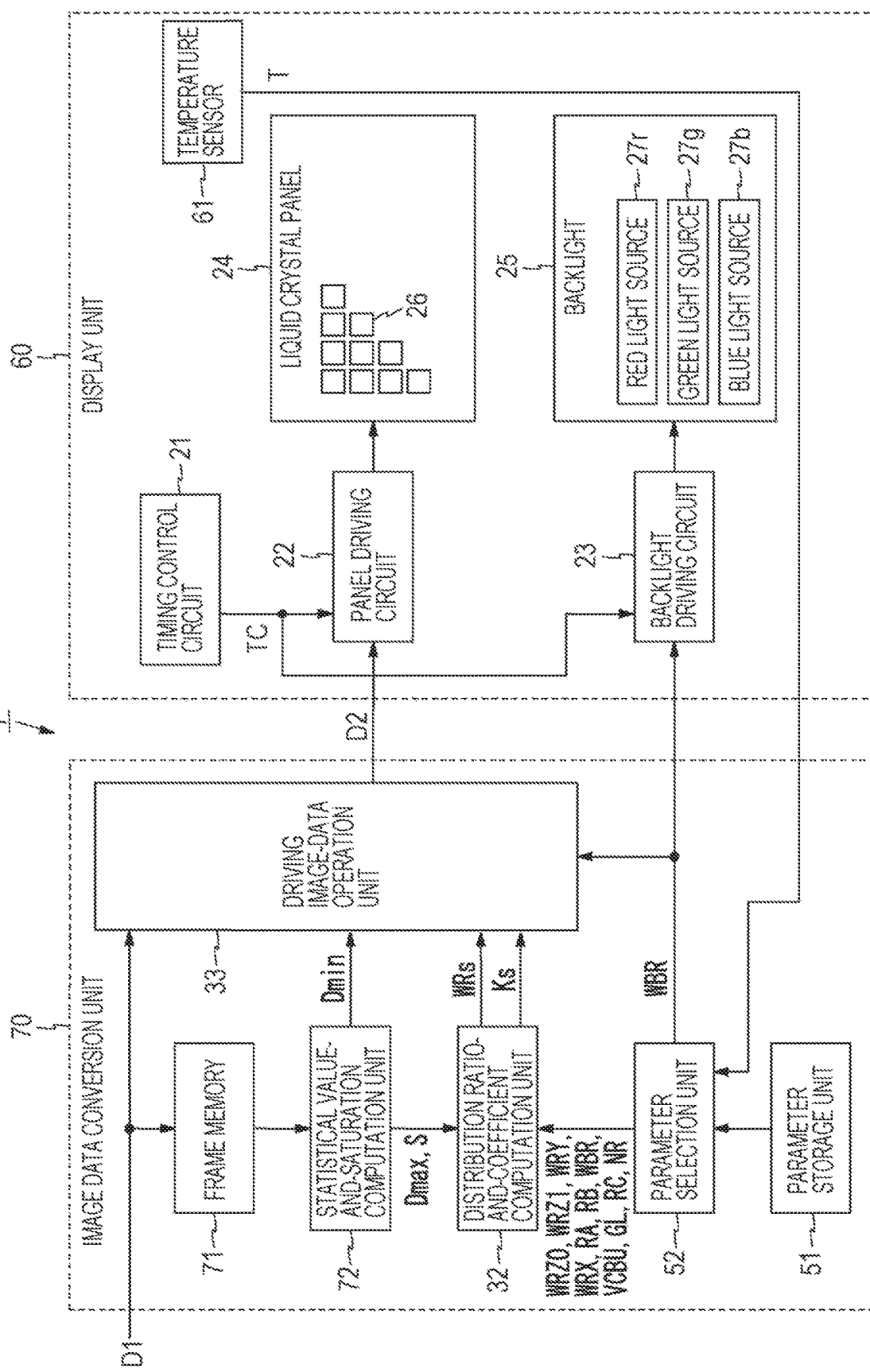
FIG. 27 is a block diagram illustrating a configuration of an image display device according to a fourth embodiment.

FIG. 27 is a block diagram illustrating a configuration of an image display device according to a fourth embodiment. An image display device 7 illustrated in FIG. 27 includes an image data conversion unit 70 and a display unit 60. The image data conversion unit 70 is obtained by adding a frame memory 71 to the image data conversion unit 50 according to the third embodiment and replacing the statistical value-and-saturation computation unit 12 with a statistical value-and-saturation computation unit 72. Differences from the third embodiment will be described below.

Input image data D1 including red image data, green image data, and blue image data is input to the image display device 7. The frame memory 71 stores input image data D1 corresponding to one frame or a plurality of frames.

Similar to the statistical value-and-saturation computation unit 12, the statistical value-and-saturation computation unit 72 obtains the maximum value Dmax, the minimum value Dmin, and the saturation S based on the input image data D1, for each pixel. At this time, the statistical value-and-saturation computation unit 72 obtains, for each pixel, the maximum value Dmax, the minimum value Dmin, and the saturation S based on the input image data D1 which has been stored in the frame memory 71 and corresponds to a plurality of pixels.

For example, when obtaining the saturation S of a certain pixel, the statistical value-and-saturation computation unit 72 may obtain the saturation for a plurality of pixels in the vicinity of this pixel, and obtain an average value, the maximum value, or the minimum value of a plurality of saturations which have been obtained. The statistical value-and-saturation computation unit 72 may perform weighting to the saturation in the neighboring pixel, in accordance with a distance or the like from the neighboring pixel and then perform calculation. Thus, since the saturation S is smoothly changed in a spatial direction or the value of the adjustment coefficient Ks in accordance with the saturation S is reduced, it is possible to reduce disharmony of an image, which occurs by a luminance difference varying depending on the saturation S. The statistical value-and-saturation computation unit 72 may obtain the saturation S by applying a filter operation to the saturation obtained for the previous frame and the saturation obtained for the current frame. The statistical value-and-saturation computation unit 72 may perform weighting to the saturation of the previous frame in accordance with a time difference or the like from the current frame, and then perform calculation. Thus, since the saturation S is smoothly changed in a time direction or the value of the adjustment coefficient Ks in accordance with the saturation S is reduced, it is possible to reduce disharmony of an image, which occurs by a luminance difference in the time direction, which varies depending on the saturation S. The statistical value-and-saturation computation unit 72 obtains the maximum value Dmax and the minimum value Dmin with the similar methods.

As described above, in the image display device 7 according to the embodiment, the image data conversion unit 70 includes the frame memory 71 that stores first image data (input image data D1), and performs conversion processing based on the first image data corresponding to a plurality of pixels stored in the frame memory 71, for each pixel. Thus, according to the image display device 7, it is possible to prevent a rapid change of the distribution ratio WRs and the adjustment coefficient Ks and to prevent an occurrence of a situation in which the color of a pixel 26 rapidly changes in the spatial direction or the time direction.

5. Modification Example

Figure 28:
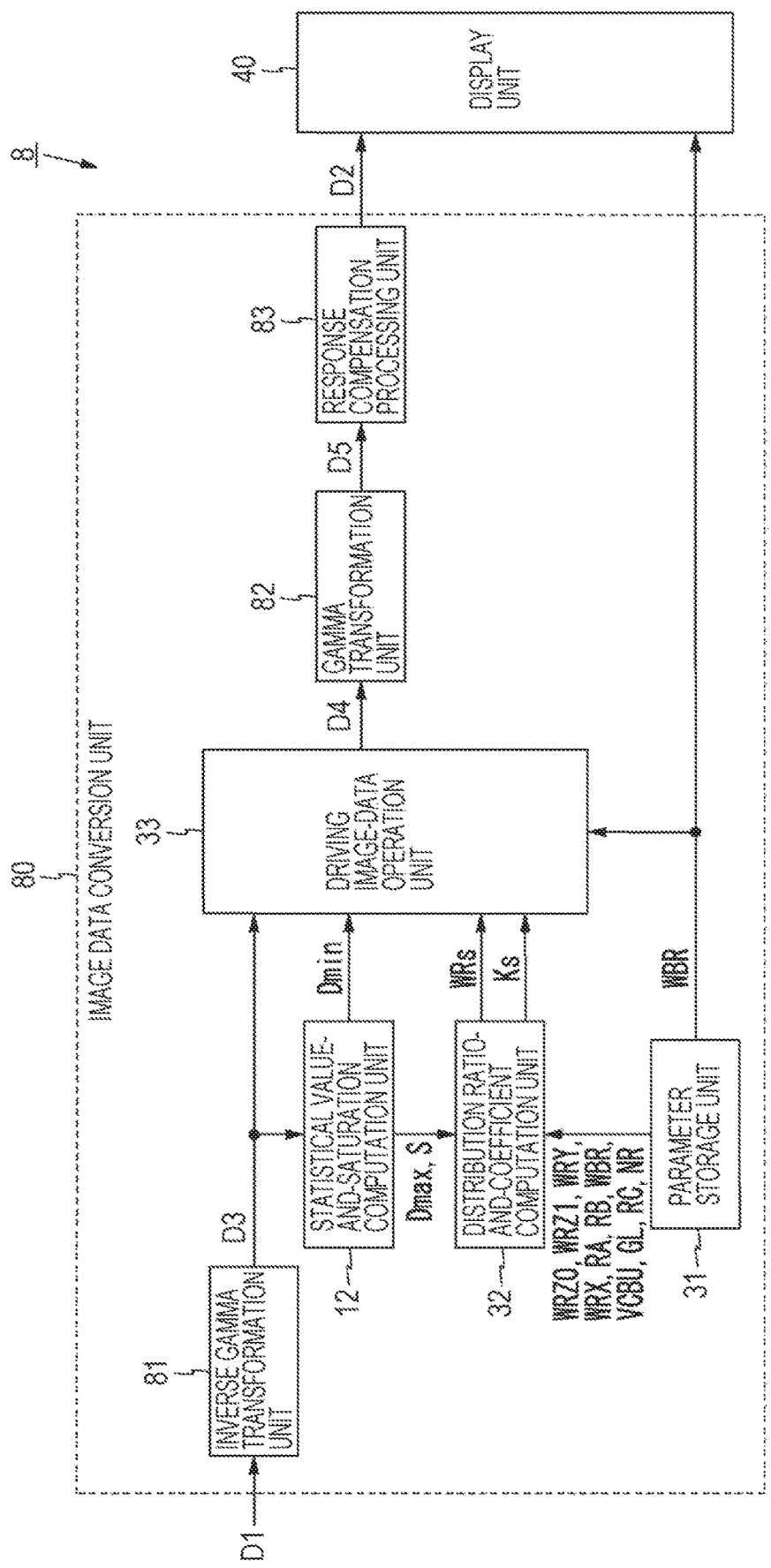
FIG. 28 is a block diagram illustrating a configuration of an image display device according to a modification example of the second embodiment.

Regarding the image display device in the embodiments, the following modification example can be made. FIG. 28 is a block diagram illustrating a configuration of an image display device according to a modification example of the second embodiment. In an image display device 8 illustrated in FIG. 28, an image data conversion unit 80 is obtained by adding an inverse gamma transformation unit 81, a gamma transformation unit 82, and a response compensation processing unit 83 to the image data conversion unit 30 according to the second embodiment.

Input image data D1 to be input to the image display device 8 is gradation data before inverse gamma transformation is performed. The inverse gamma transformation unit 81 performs inverse gamma transformation on the input image data D1 so as to obtain image data D3 after inverse gamma transformation. The parameter storage unit 31, the statistical value-and-saturation computation unit 12, the distribution ratio-and-coefficient computation unit 32, and the driving image-data operation unit 33 perform kinds of processing similar to those in the second embodiment, on the image data D3 after the inverse gamma transformation, respectively. Thus, image data D4 before gamma transformation is obtained. The gamma transformation unit 82 performs gamma transformation on the image data D4 before the gamma transformation, so as to obtain image data D5. The response compensation processing unit 83 performs response compensation processing on the image data D5 so as to obtain driving image data D2. In the response compensation processing unit 83, overdrive processing (may also be referred to as "overshoot processing") of compensating for insufficiency of the response rate of a pixel 26.

In the image display device 8 according to the modification example, the image data conversion unit 80 obtains driving image data D2 in a manner that conversion processing (image-data conversion processing) of converting first image data (image data D3 after the inverse gamma transformation) corresponding to a plurality of primary colors into second image data (image data D4 before the gamma transformation) corresponding to a plurality of subframes is performed for each pixel, and response compensation processing is performed on image data D5 after the conversion processing has been performed. Thus, according to the image display device 8, it is possible to display a desired image even in a case where the response rate of the display unit 60 is slow.

The image data conversion unit 80 includes the inverse gamma transformation unit 81, the gamma transformation unit 82, and the response compensation processing unit 83. Instead, the image data conversion unit may include the inverse gamma transformation unit 81 and the gamma transformation unit 82, but may not include the response compensation processing unit 83. Alternatively, the image data conversion unit may include the response compensation processing unit 83, but may not include the inverse gamma transformation unit 81 and the gamma transformation unit 82. At least one of the inverse gamma transformation unit 81 and the gamma transformation unit 82, and the response compensation processing unit 83 may be added to the image data conversion unit 30 according to the second embodiment. The gamma transformation may be performed after the response compensation processing. In this case, the response compensation processing is performed on image data output from the driving image-data operation unit. The gamma transformation is performed on image data after the response compensation processing.

In the first to fourth embodiments, the distribution ratio-and-coefficient computation unit obtains the coefficient Ks so as to satisfy the expression (1), and thus the expression of RB=1−RA is satisfied (see FIG. 2). Instead, the distribution ratio-and-coefficient computation unit may obtain the coefficient Ks such that the minimum value DDmin and the maximum value DDmax are in a certain limited range which has been set in a range satisfying 0≤DDmin≤1 and 0≤DDmax≤1. For example, the boundary of the limited range illustrated in FIG. 2 is a straight line. However, the boundary of the limited range may be a curved line or a polygonal line having an inflection point. Here, the border of the limited range is preferably a straight line or a curved line.

In the first to fourth embodiments, the image display device that obtains the distribution ratio WRs and the coefficients Ks and Ksv by specific calculation expressions is described. However, as the calculation expressions of obtaining the distribution ratio WRs and the coefficients Ks and Ksv, expressions other than the calculation expressions described in the embodiments may be provided. For example, as the calculation expression of obtaining the distribution ratio WRs, a calculation expression which has been known from the past may be used. As the calculation expression of obtaining the coefficient Ksv, any calculation expression satisfying the expression (47) may be used.

Hitherto, the image display devices according to the first to fourth embodiments and the modification example thereof are described. Any combination of the features of the image display devices according to the first to fourth embodiments and the modification example thereof as long as the features do not contradict the properties thereof can constitute image display devices according to various modification examples.

In the first to fourth embodiments, an image is displayed by controlling transmittance of the liquid crystal panel 24 in which the liquid crystal panel 24 that causes light from the backlight 25 as the light source unit to be transmitted therethrough is used as the display device. However, the present invention is not limited to a field sequential display device using a transmission type optical modulator as with the liquid crystal panel 24. The present invention can also be applied to a field sequential display device using a reflection type optical modulator. For example, the present invention can also be applied to a field sequential projection type display device in which a reflection type liquid crystal panel called as a liquid crystal-on-silicon (LCOS) is used as an optical modulator. The present invention can be applied to a field sequential image display device other than a liquid crystal display apparatus, for example, a spontaneous-emission image display device such as an organic electroluminescence (EL) display device, a see-through image display device having a function of seeing through the back of the display panel, or the like.

In the first to fourth embodiments, each frame period is configured with primary-color subframe periods of the blue color, the green color, and the red color and the white subframe period (subframe having a white color which is a common color of blue, green, and red) as the common-color subframe period. Instead, each frame period may be configured with a subframe period of another primary color and the common-color subframe period. In this specification, it is assumed that "the common color" means a color including all color components of primary colors corresponding to primary-color subframe periods in each frame period, and the ratio of the color components is not limited. From a viewpoint that the occurrence of color breakup is suppressed by the common color subframe, a common-color subframe period (for example, a subframe period of a yellow color configured with red and green) corresponding to another color configured with two primary colors may be used as the white subframe period as the common-color subframe period. From a similar viewpoint, any color other than black, for example, "yellowish green", "red", or "red having the half luminance" can be caused to correspond to the common-color subframe period instead of "white" or "yellow".

6. Others

This application claims priority right based on Japanese Patent Application No. 2016-223886 entitled "field sequential image display device and image display method" filed on Nov. 17, 2016, and the contents of this Japanese application are included in the present application by reference.

REFERENCE SIGNS LIST 1, 3, 5, 7, 8 IMAGE DISPLAY DEVICE
10, 30, 50, 70, 80 IMAGE DATA CONVERSION UNIT
20, 40, 60 DISPLAY UNIT
11, 31, 51 PARAMETER STORAGE UNIT
12, 72 STATISTICAL VALUE-AND-SATURATION COMPUTATION UNIT
13, 32 DISTRIBUTION RATIO-AND-COEFFICIENT COMPUTATION UNIT
33 DRIVING IMAGE-DATA OPERATION UNIT
21 TIMING CONTROL CIRCUIT
22 PANEL DRIVING CIRCUIT (LIGHT-MODULATION-UNIT DRIVING CIRCUIT)
23 BACKLIGHT DRIVING CIRCUIT (LIGHT-SOURCE-UNIT DRIVING CIRCUIT)
24 LIQUID CRYSTAL PANEL (LIGHT MODULATION UNIT)
25 BACKLIGHT (LIGHT SOURCE UNIT)
26 PIXEL
27 LIGHT SOURCE
52 PARAMETER SELECTION UNIT
61 TEMPERATURE SENSOR
71 FRAME MEMORY
81 INVERSE GAMMA TRANSFORMATION UNIT
82 GAMMA TRANSFORMATION UNIT
83 RESPONSE COMPENSATION PROCESSING UNIT
Ks ADJUSTMENT COEFFICIENT
WRs DISTRIBUTION RATIO OF WHITE SUBFRAME (COMMON-COLOR DISTRIBUTION RATIO)
WRs1 FIRST DISTRIBUTION RATIO (TENTATIVE DISTRIBUTION RATIO)
WRsv2 SECOND DISTRIBUTION RATIO

The invention claimed is:

1. A field sequential image display device in which a plurality of subframe periods including a plurality of primary-color subframe periods respectively corresponding to a plurality of primary colors and at least one common-color subframe period is included in each frame period, the device comprising:
an image data conversion unit that receives input image data corresponding to the plurality of primary colors and generates driving image data corresponding to the plurality of subframe periods from the input image data by obtaining a pixel data value of each of the plurality of subframe periods for each pixel of an input image represented by the input image data, based on the input image data; and
a display unit that displays an image based on the driving image data,
wherein the image data conversion unit generates the driving image data by conversion processing in which, for each pixel in the input image, an adjustment coefficient to be multiplied by a value of the pixel and a common-color distribution ratio are determined, and a pixel data value in each of the plurality of subframe periods is obtained from the value of the pixel based on the adjustment coefficient and the common-color distribution ratio, the common-color distribution ratio being defined as a ratio of a display light quantity of a common color component, which is to be emitted in the common-color subframe period to a display light quantity of the common color component, which is to be emitted in one frame period for displaying the pixel; and
in the conversion processing, for each pixel in the input image, the common-color distribution ratio is determined in accordance with the saturation and an adjusted brightness of the pixel such that the common-color distribution ratio increases as a hue and the saturation in a hue-saturation-value (HSV) color space are maintained, and the adjusted brightness decreases, and the pixel is allowed to be displayed in the display unit, the adjusted brightness being a brightness after the value of the pixel is multiplied by the adjustment coefficient.

2. The image display device according to claim 1,
wherein, for each pixel in the input image, the image data conversion unit
determines a tentative distribution ratio corresponding to the ratio in accordance with the saturation of the pixel such that the pixel data value in the common-color subframe period is greater than a minimum value of pixel data values in the plurality of primary-color subframe periods and smaller than a maximum value thereof, and
determines the common-color distribution ratio based on the tentative distribution ratio in accordance with the adjusted brightness of the pixel.

3. The image display device according to claim 1,
wherein the image data conversion unit includes a parameter storage unit that stores a parameter used in the conversion processing, and
the parameter storage unit stores a parameter in accordance with response characteristics in image display in the display unit.

4. The image display device according to claim 3,
wherein the image data conversion unit further stores a parameter for designating a range of a maximum value in accordance with a minimum value of pixel data values of each pixel in the input image in the plurality of subframe periods.

5. The image display device according to claim 3,
wherein the display unit includes
a light source unit that emits light having a corresponding color in each subframe period,
a light modulation unit that cause the light from the light source unit to be transmitted therethrough or be reflected thereby,
a light-source-unit driving circuit that drives the light source unit to irradiate the light modulation unit with the light having the corresponding color in each subframe period, and
a light-modulation-unit driving circuit that controls transmittance or reflectance in the light modulation unit such that an image of the corresponding color in each subframe period is displayed,
the parameter storage unit further stores a light emission control parameter, and
the light-source-unit driving circuit controls light emission luminance of the common color in the light source unit based on the light emission control parameter.

6. The image display device according to claim 1,
wherein the image data conversion unit obtains the common-color distribution ratio in accordance with a function having a value which smoothly changes depending on the saturation.

7. The image display device according to claim 1,
wherein the image data conversion unit generates the driving image data by conversion processing in which, for each pixel in the input image, the adjustment coefficient is determined based on pixel data values in the plurality of subframe periods in accordance with the saturation of the pixel in a range in which the pixel is allowed to be displayed in the display unit, and the pixel data value in each of the plurality of subframe periods is obtained from the value of the pixel based on the adjustment coefficient and the common-color distribution ratio.

8. The image display device according to claim 7,
wherein the image data conversion unit obtains the common-color distribution ratio and the adjustment coefficient in accordance with functions having a value which smoothly changes depending on the saturation.

9. The image display device according to claim 7,
wherein the image data conversion unit determines the adjustment coefficient and the common-color distribution ratio such that a maximum value is linearly limited with respect to a minimum value among pixel data values in the plurality of subframe periods, for each pixel in the input image.

10. The image display device according to claim 7,
wherein the image data conversion unit
assumes a function of the saturation, which indicates a tentative coefficient for obtaining the adjustment coefficient and a function of the saturation, which indicates a correction coefficient to be multiplied by the tentative coefficient, and
obtains a multiplication result of the tentative coefficient and the correction coefficient based on the saturation of the pixel for each pixel in the input image, as the adjustment coefficient, and
the correction coefficient is set such that a rate of the adjustment coefficient changing with respect to the saturation when the saturation is equal to or smaller than a predetermined value is equal to or smaller than a predetermined value.

11. The image display device according to claim 1,
wherein the image data conversion unit includes a parameter storage unit that stores a parameter used in the conversion processing,
the display unit includes a temperature sensor,
the parameter storage unit stores a plurality of values for the parameter, in accordance with a temperature, and
the image data conversion unit selects the value in accordance with the temperature measured by the temperature sensor among the plurality of values stored in the parameter storage unit and uses the selected value in the conversion processing.

12. The image display device according to claim 1,
wherein the image data conversion unit
includes a frame memory that stores the input image data, and
generates the driving image data corresponding to a pixel, based on the input image data which has been stored in the frame memory and corresponds to a plurality of pixels, for each pixel in the input image.

13. The image display device according to claim 1,
wherein the image data conversion unit performs the conversion processing on normalized luminance data.

14. The image display device according to claim 1,
wherein the image data conversion unit obtains the driving image data by performing response compensation processing on image data obtained after the conversion processing.

15. The image display device according to claim 1,
wherein the plurality of primary colors includes blue, green, and red, and the common color is white.

16. A field sequential image display method in which a plurality of subframe periods including a plurality of primary-color subframe periods respectively corresponding to a plurality of primary colors and at least one common-color subframe period is included in each frame period, the method comprising:
an image-data conversion step of receiving input image data corresponding to the plurality of primary colors and generating driving image data corresponding to the plurality of subframe periods from the input image data by obtaining a pixel data value of each of the plurality of subframe periods for each pixel of an input image represented by the input image data, based on the input image data; and
a display step of displaying an image based on the driving image data,
wherein the image-data conversion step includes
a coefficient-and-distribution ratio determination step of determining an adjustment coefficient to be multiplied by a value of the pixel and determining a common-color distribution ratio defined as a ratio of a display light quantity of a common color component, which is to be emitted in the common-color subframe period to a display light quantity of the common color component, which is to be emitted in one frame period for displaying the pixel, for each pixel in the input image; and
a driving image-data operation step of generating the driving image data by conversion processing of obtaining the pixel data value in each of the plurality of subframe periods from the value of the pixel based on the adjustment coefficient and the common-color distribution ratio, for each pixel in the input image; and
in the coefficient-and-distribution ratio determination step, for each pixel in the input image, the common-color distribution ratio is determined in accordance with the saturation and an adjusted brightness of the pixel such that the common-color distribution ratio increases as a hue and the saturation in a hue-saturation-value (HSV) color space are maintained, and the adjusted brightness decreases, and the pixel is allowed to be displayed in the display unit, the adjusted brightness being a brightness after the value of the pixel is multiplied by the adjustment coefficient.

* * * * *